(12) United States Patent
Kjaer

(10) Patent No.: US 9,465,787 B2
(45) Date of Patent: Oct. 11, 2016

(54) ELECTRONIC MATHEMATICAL MODEL BUILDER

(75) Inventor: Henrik Kjaer, Greve (DK)

(73) Assignee: EPISTA SOFTWARE A/S, Copenhagen K (DK)

( * ) Notice: Subject to any disclaimer, the term of this patent is extended or adjusted under 35 U.S.C. 154(b) by 1711 days.

(21) Appl. No.: 10/577,956

(22) PCT Filed: Nov. 2, 2004

(86) PCT No.: PCT/DK2004/000755
§ 371 (c)(1),
(2), (4) Date: Feb. 15, 2007

(87) PCT Pub. No.: WO2005/043406
PCT Pub. Date: May 12, 2005

(65) Prior Publication Data
US 2007/0244672 A1   Oct. 18, 2007

(30) Foreign Application Priority Data

Nov. 3, 2003   (DK) ................................. 2003-01635
Aug. 9, 2004   (DK) ................................. 2004-01208

(51) Int. Cl.
| | |
|---|---|
| G06F 17/00 | (2006.01) |
| G06F 17/24 | (2006.01) |
| G06F 17/21 | (2006.01) |
| G06F 17/22 | (2006.01) |

(52) U.S. Cl.
CPC ........... *G06F 17/246* (2013.01); *G06F 17/211* (2013.01); *G06F 17/2247* (2013.01); *G06F 17/24* (2013.01); *G06F 17/245* (2013.01)

(58) Field of Classification Search
CPC .. G06F 17/246; G06F 17/245; G06F 17/211; G06F 17/2247; G06F 17/24
USPC .................................. 715/212–220, 273, 713
See application file for complete search history.

(56) References Cited

U.S. PATENT DOCUMENTS

| | | | |
|---|---|---|---|
| 5,255,363 A | 10/1993 | Seyler | |
| 5,416,895 A | 5/1995 | Anderson et al. | |
| 5,603,021 A * | 2/1997 | Spencer et al. | ............... 715/853 |
| 5,752,253 A | 5/1998 | Geymond et al. | |

(Continued)

FOREIGN PATENT DOCUMENTS

| | | |
|---|---|---|
| EP | 0 358 492 A | 3/1990 |
| EP | 0 690 394 A | 1/1996 |
| WO | WO 01/80103 A | 10/2001 |

*Primary Examiner* — Quoc A Tran
(74) *Attorney, Agent, or Firm* — Volentine & Whitt, PLLC

(57) ABSTRACT

The present invention relates generally to the field of information processing by digital computers and, more particularly, to the entry and processing of information by application programs, particularly spreadsheets. The present invention is an electronic mathematical model builder that comprises a memory for storage of data, a processor for defining addressable sets of cells stored in the memory with a unique identifier, for entering data into the cells and for processing data stored in the cells, a user interface with a display for displaying sets of cells in a work area and means for creating and positioning sets of cells in the work area and inputting data to be entered into the cells, and a function builder for building mathematical relations between cells, comprising fields for user specification of a desired function by mathematical operators and input variables of the function, and set of destination cells containing values of the function.

29 Claims, 37 Drawing Sheets

(56) References Cited

U.S. PATENT DOCUMENTS

| | | | |
|---|---|---|---|
| 5,890,174 A | 3/1999 | Khanna et al. | |
| 6,138,130 A * | 10/2000 | Adler et al. | 715/210 |
| 6,988,241 B1 * | 1/2006 | Guttman et al. | 715/220 |
| 2003/0040936 A1 * | 2/2003 | Nader et al. | 705/1 |
| 2003/0097318 A1 * | 5/2003 | Yu et al. | 705/35 |
| 2003/0220795 A1 * | 11/2003 | Arayasantiparb et al. | 704/275 |
| 2004/0103366 A1 * | 5/2004 | Peyton-Jones et al. | 715/503 |
| 2005/0039114 A1 * | 2/2005 | Naimat et al. | 715/503 |
| 2005/0044496 A1 * | 2/2005 | Kotler et al. | 715/538 |
| 2009/0083615 A1 * | 3/2009 | Kotler et al. | 715/219 |

\* cited by examiner

| Cell | Formula | | Comments |
|---|---|---|---|
| A4 | =B1*A1 | | VAT |
| B4 | =IF(A4 100;A4*C1;A4*C1*1.5) | <= | Shipping cost |
| A7 | = A1+A4+B4 | | Total cost |

(Prior art)

Fig. 1

| Cell | Formula | Comments |
|---|---|---|
| B2 | 8500 | sales |
| B3 | 6800 | costs |
| B4 | =B2-B3 | gross profit |
| B5 | =B4/B2 | gross profit percentage |

(Prior art)

Fig. 2

(Prior art)

(Prior art)

Fig. 7

ELECTRONIC MATHEMATICAL MODEL BUILDER

CROSS REFERENCE TO RELATED APPLICATIONS

This application is the national phase under 35 U.S.C. 371 of PCT International Application No. PCT/DK2004/000755 which has an international filing date of Nov. 2, 2004, and also claims priority under 35 U.S.C. 119 to Danish application PA 2003 01635 filed on Nov. 3, 2003, and Danish application PA 2004 01208 filed on Aug. 9, 2004, all of which applications are hereby incorporated by reference in their entirety for all purposes as if fully set forth herein.

FIELD OF THE INVENTION

The present invention relates generally to the field of information processing by digital computers and, more particularly, to the entry and processing of information by application programs, particularly spreadsheets.

BACKGROUND OF THE INVENTION

The present description relies on technical terms used in connection with operation of a spreadsheet program, including spreadsheet formulas, for an overview see e.g. Microsoft Excel 2002 Bible, John Walkenbach, John Wiley & Sons Inc; ISBN: 0764535838.

Before computers, numerical analyses, particularly financial analyses, were usually prepared on an accountant's columnar pad or spreadsheet, with pencil and calculator in hand. By organizing data into columns and rows, spreadsheets afford the rapid assimilation of information by a reader. The task of preparing a spreadsheet on paper, however, is not quite so fast. Instead, the process tends to be very slow, as each entry must be tediously calculated and entered into the spreadsheet. Since all calculations are the responsibility of the person preparing the spreadsheet, manually prepared spreadsheets are also prone to errors. Hence, preparation of spreadsheets by hand is slow, tedious, and unreliable.

With the advent of microcomputers, a solution was forthcoming in the form of "electronic spreadsheets." Better known simply as "spreadsheets," these software programs provide a computerized replacement for the traditional financial modelling tools: The accountant's columnar pad, pencil, and calculator. The improvement represented by a spreadsheet program over these tools may be compared with the improvement provided by a word processor over a typewriter. Spreadsheets offer a dramatic improvement in ease of creating, editing, and using financial models.

A spreadsheet provides millions of cells grouped together in a single sheet or document. A single cell may contain a value, a label or a formula. In a conventional spreadsheet, millions of cells are provided even though only e.g. 25 cells are needed for a specific task. A conventional spreadsheet typically offers 256 columns and 65536 rows amounting to 16,777,216 cells. Most of the cells are not visible. A standard monitor typically displays about 500 cells at the time (33 rows by 15 columns). If a spreadsheet model covers more than 33 rows or 15 columns on a standard monitor, the user will either have to scroll up and down to manage or work with the spreadsheet model or open different windows e.g. showing different parts of the model at the time.

Data is entered into an electronic spreadsheet in much the same way as an accountant enters information on his pad. After the user has positioned a screen cursor at a desired location (a cell), the user can enter alphanumeric information. Besides holding text and numerical information, however, spreadsheet cells can store special instructions or formulas specifying calculations to be performed on the data stored in spreadsheet cells. This is in fact one of the major disadvantages of conventional spreadsheets: Data and the user interface form a complex structure. For example, a single cell may contain a text-based formula hidden underneath the displayed numerical output value of the formula. Hence it is not easy for a spreadsheet user to document a spreadsheet model (i.e. describe to other users how to use a specific model and ensure that the model gives the correct result).

During creation of a particular spreadsheet model, a user enters formulas into cells the same way he or she enters values and labels.

Spreadsheet formulas are fundamental to the creation and operation of a spreadsheet.

A spreadsheet formula has a specific syntax defined by the spreadsheet designer. Typically, a formula begins with a special token (e.g. =, + or @) to distinguish the formula from raw data, followed by tokens as operators (e.g. +−/), values, cell references (e.g. =(B1−B2)/100), and/or built-in functions (e.g. =SUM (A1:A12)). Cell references or addresses can serve as variables in an equation, thereby allowing precise mathematical relationships to be defined between cells.

Before meaningful results of a given spreadsheet can be presented to a user, the formulas of a given spreadsheet model must be evaluated or recalculated. "Recalculation" is the process by which spreadsheet cells, particularly those holding formulas, are updated. In a conventional spreadsheet system, the standard recalculation order is termed "natural".

Suppose, for example, that it is desired to calculate the price of a good including VAT and shipping costs: The user enters the price of a good in cell A1, the VAT rate in cell B1 and the shipping rate in cell C1. The formula for VAT is entered in cell A4, shipping costs are calculated in cell B4, and total cost is calculated in cell A7, cf. FIG. 1.

By entering different values in cell A1, the user can calculate the total costs. Each time the user enters a new value in cell A1 the spreadsheet system recalculates the model to show the result in cell A7. Interdependencies between the cells dictate how a spreadsheet system actually performs recalculation. Before the spreadsheet system can recalculate the formula in cell A7, the spreadsheet system must recalculate the formulas in the cells, A4 and B4. In the same way, the spreadsheet system must recalculate the formula in cell A4 before it can recalculate the formula in cell B4. This gives the order of recalculation: A4→B4→A7.

Users can use more than one built-in function in a single formula, with one built-in function constituting an argument or parameter to another built-in function. This is termed "nesting" built-in functions. Generally, a user can nest as many built-in functions as desired. For example, the nested function below calculates the average values in cell block C1:C14, and then rounds the average to two decimal places:

=ROUND(AVG($C1:C14$);2)

Nested built-in functions evaluate from inside out. In the above example, for instance, the AVG is calculated before the ROUND.

When formula syntax and arguments are correct, most built-in functions and formulas recalculate to a numeric value (including dates) or a string value (label or text). If the user does not enter the formulas in a cell correctly, the result of a recalculation is a special value ERR (an error). It is therefore a precondition that the user of a spreadsheet system is familiar with the syntax of a spreadsheet formula. Different spreadsheet systems have different syntaxes to obey.

For example, if a spreadsheet user has to write the formula described in cell B4 in FIG. 1, the user has to know the syntax of an IF built-in function. (Three arguments divided by a special the token ';' or other argument separator (as specified by the implementation) and the meaning of the token '<=' not greater etc.).

With the present trend of employing electronic spreadsheets to model increasingly complex data models, conventional spreadsheets have disadvantages.

One disadvantage is related to the ability of most users to correctly enter and understand complex cell formulas using a conventional electronic spreadsheet system. Some formula-builder systems have been developed to address this problem, e.g. as disclosed in U.S. Pat. No. 5,603,021. Formula-builders constitute a major improvement of spreadsheets and have certainly assisted the user in building a formula with the correct syntax. However, it has not solved the problem that most spreadsheet users find it difficult to manage the syntax of a spreadsheet formula. Consequently the average spreadsheet user has difficulty in understanding the logic of a formula and hence the logic of the spreadsheet.

Another disadvantage is related to the ability to reuse formulas.

For example, the cell formula:

=ROUND(AVG(C1:C14);2)

is constructed of two built-in functions and operates on the cellblock C1:C14. If it is desired to reuse this formula in a conventional spreadsheet, it must be copied and pasted to a different cell location either in the same spreadsheet or another spreadsheet that are currently residing in the memory of the computer. The copy and paste process will in turn adjust the relative cell references in the spreadsheet formula. If the formula is pasted into a cell located two columns to the right of the cell it was copied from, the cell references is adjusted to E1:E14. It is not possible to save the function as a built-in function under a name, e.g. ROUND_AVG_2 to for reuse on other cell references or as a nested function.

Typically, a financial spreadsheet includes a feature termed Goal Seek.

Consider a sales budget spreadsheet with Sales of 50000 in Cell B2, Costs of 45000 in Cell B3 and the formula=B2−B3 in Cell B4 to calculate gross profit. Further, cell B5 holds the formula=B4/B2 to calculate the gross profit percentage, cf. FIG. 2.

After a recalculation the result, 20% is displayed in cell B5. However, it is desired to reduce the costs to obtain a gross profit percentage of 25%. To obtain the wanted result, the spreadsheet user may enter random values manually into cell B3 until B5 attains the value 25%. Each time the user enters a new value in the cell the spreadsheet model recalculates. Another solution is to use the built-in Goal Seek tool, which is part of most modern spreadsheet systems. A typical Goal Seek tool has a dialog box where the user can enter specifications, cf. FIG. 3.

By entering the specified information in the dialog box and clicking the OK button, the Goal Seek tool starts an iterative process to find the specified value. The process resembles the process of finding the root in an equation. Various root-finding techniques are available, cf. e.g. William Press, Saul A Teukolsky, William T. Vetterling, and Brian P Flannery, Numerical Recipes in C. Cambridge University Press, second edition, 1992.

Regardless of the specific technique used in the spreadsheet system, the goal seek function will insert values in the specified "changing cell" until the desired condition is fulfilled. The condition is fulfilled if the desired value is within a range of ± a delta value from the value specified in the "equal to cell". If the condition is not fulfilled, the goal seek function will stop after a maximum number of iterations (typical 500 iterations). Each time a new value is inserted in the "changing cell" by the goal seek tool the spreadsheet model is recalculated and the value in the "make cell" is compared with the value in the "equal to cell". Thus, the goal seek tool is external to the spreadsheet model meaning that the goal seek function is not recalculated each time the sales budget spreadsheet model is recalculated. If the goal seek tool was part of the spreadsheet model, the goal seek process (root finding) would restart each time the spreadsheet model was recalculated after a new value is inserted into the "changing cell", a process that would lead to an infinite loop. Instead the user must initiate the goal seek loop from a dialog box.

It is a disadvantage of conventional spreadsheets that the goal seek function must be external to the spreadsheet to avoid infinitive recalculation. Further, the inexperienced spreadsheet user finds it difficult to manage a spreadsheet model and specify the demanded input in the goal seek dialog box.

SUMMARY OF THE INVENTION

It is an object of the present invention to provide a new calculation tool that overcomes the above-mentioned disadvantages.

According to the present invention, an electronic mathematical model builder that fulfils the above-mentioned and other objects, comprises
a memory for storage of data,
a processor for defining addressable sets of cells stored in the memory with a unique identifier, for entering data into the cells and for processing data stored in the cells,
a user interface with a display for displaying sets of cells in a work area and means for creating and positioning sets of cells in the work area and inputting data to be entered into the cells.

The electronic mathematical model builder may further comprise a function builder for building mathematical relations between cells, comprising fields for user specification of a desired function by mathematical operators and input variables of the function, and a set of destination cells containing values of the function.

It is an important advantage of the present invention that a function created with the function builder is not inherently connected to one or more specific cells as in conventional spreadsheets. On the contrary, the operator of the mathematical model builder is free to define input cells containing input values for the function and destination cells containing output values of the function. In a preferred embodiment of the invention, a new set of cells is created containing the output values of the function. Further, the function may be stored in the memory as an independent entity for later retrieval and possible editing, the editing including one or more of the following: Renaming, redefinition of cell addresses of input variables, redefinition of cell addresses of output variables, modification of the function, etc.

An electronic mathematical model builder according to the present invention may comprise features and functions of conventional spreadsheets, such as cell display format features, mathematical functions, charts, cell protection features, user interface features, such as icons, tools, tool bars, etc., etc.

For example, a cell may contain various types of data, such as a numerical value, an alphanumeric string, a logical value, a formula, etc.

Further, various features of a cell may be specified by a user, features such as character fonts used to display the contents of a cell, attributes of displayed characters, such as underline, overline, bold, italic, etc., justification in a cell of a string displayed, such as left, right, centre, etc., attributes of displayed borders, patterns, and colours of cells, etc.

Cells may be copied, pasted, moved, etc., either into the current model or into another model, and cells may be inserted into, deleted from, or cleared in the current model.

Graphical objects, such as lines, arrows, rectangles, ellipses, arcs, polygons, text boxes, etc., may be created in the model.

Charts, such as line charts, pie charts, bar charts, area charts, column charts, XY (scatter) charts, radar charts, 3D type charts, etc., based on cell data may be created.

Cells of a model may be displayed in two dimensions by means for displaying cells, such as a CRT monitor, a LCD monitor, a plasma monitor, a printer, etc., e.g. in a way well-known in the art of spreadsheets, i.e. as a grid-like table or matrix of cells holding data. In one embodiment, the grid-like table or matrix is formed of a series of columns intersecting a series of rows. The columns extend from a peripheral horizontal axis of the matrix while the rows extend from a peripheral vertical axis of the matrix. Each row is labelled with a numeral (1, 2, 3 . . . ) along the peripheral vertical axis and each column is labelled with a letter (A, B, C, . . . ) along the peripheral horizontal axis. An intersection of a row and column forms a cell, which receives a label formed by the composition of the respective labels of the specific row and column (e.g. C5).

In a preferred embodiment of the invention, cells are created and displayed in sets or panels. Each set or panel may be individually and independently positioned or moved around in the display of the model, e.g. using a mouse and a cursor to drag the set or panel in question to a desired position within the display of the model. A panel may hold one cell, a column of cells, a row of cells or a two-dimensional matrix of cells. The displayed panel may have row labels, column labels and a unique identifier. The panel identifier, its row number, and its column number uniquely identify each cell in the panel. The panel may further have a number of attributes defining features of the panel (e.g. the visibility of the row and column labels, the colour of the labels and cells, edibility of the cells, number format etc.).

In the illustrated embodiment of the present invention, the number of cells in a panel may be greater than the number of visible cells. The system provides means for the user to adjust the number of cells in a panel as well as the number of visible cells. Further, the system provides means for attaching a scrollbar to one or a group of panels with the purpose of scrolling cells outside the visible area into the displayed panel area.

The display of the model may comprise one or more sheets.

In the function builder, cells providing input values to the function may be selected in a way similar to or identical to the way cells are selected in conventional spreadsheets, i.e. selecting desired cells using a pointing device, such as a mouse and a display cursor. Cells for holding output values of the function may be selected in the same way. Selected cells may be dragged and dropped into the function field of the function builder for definition of the selected cells as cells holding input values or output values, respectively. In a preferred embodiment, the function builder creates a new set or panel of cells to hold output function values.

The function builder may comprise components for selection by the user for specification of the function. The components may be function components, such as mathematical operators, mathematical functions, logical and Boolean functions, financial functions, string functions, data base functions, etc.

A function component may be a Java class that encapsulates the algorithm of a specific function, e.g. a mathematical function, a logical and Boolean function, a financial function, a string function, a data base function, etc, and the data that is input for the function.

Further, the components may be data components, such as data of a set of cells, data from an external data source, etc. For example, a data component may be a Java class that holds an object reference to a specific data source, e.g. a set of cells or an external database.

Further, the function builder may comprise graphical symbols relating to respective components for selection by the user to be incorporated into the desired function. The graphical symbols relating to respective components may be organized in various ways, e.g. under various tabs according to their type, in a graphical, hierarchical diagram according to their type, etc.

The user may select a specific component to be included in the function by dragging and dropping the corresponding graphical symbols into the function field of the function builder.

The graphical symbols that correspond to components in the model or function may comprise one or more input and/or output ports, which symbolize the respective input and/or output of the function components.

Further the components of a model or function may be connected by dragging and dropping of connection lines between the input/output ports of the graphical symbols in the function field.

The input/output ports of the graphical symbols may have one or more different colours or form to facilitate building of functions. One or more colours may be applied to input ports and the same or other colours may be applied to output ports. The colour of an input/output port may depend on the type of input/output, e.g. string, integer, function, array, etc. or the order of arguments.

Employment of coloured ports in graphical symbols in the function field facilitates a comprehensive view of the components of a model and eases construction of a model. The function builder may further comprise tools for specification of calculation type, such as by row, by column, all cells in a panel, selected cells in a panel, accumulated or non-accumulated, etc.

In order to be able to store and retrieve functions built with the function builder, the user interface may comprise means for naming functions built with the function builder, and may comprise means for storage and retrieval of functions in a memory.

The model builder may comprise means for storing a selected part of the model, such as the entire model, in the memory.

A first function may constitute an input variable to a second function.

The function builder may further comprise tools for user definition of a mathematical operator.

Thus, according to an embodiment of the present invention, an electronic mathematical model builder is provided having a user interface providing input tools, such as a keyboard and a pointing device, e.g. a mouse, a trackball, a pen, etc, and a display displaying a cursor that is controlled by the pointing device, to be controlled by an operator of the builder to 1) create cell panels in a model document resembling a conventional spreadsheet, 2) creating and editing functions, such as mathematical formulas, 3) assigning functions to desired cells in the model document, and 4) storing functions in a library of user defined functions.

The model builder may further include tools for saving a model document with or without data for example as a standalone application, e.g. as a Java .jar file, an .exe file or a Java Applet, or a serverside application e.g. a Java Servlet.

The model builder may also include tools for documenting the structure of a specific model document.

With the present invention, users may construct model documents in substantially less time and with fewer errors than what is possible with conventional spreadsheet systems.

The model builder may be accessed through an Internet browser.

Different rights may be assigned to different users, e.g. so that some users may be able to display and import data from a specific mathematical model while others may be allowed to edit various or all parts of the model.

Further, the user may build standalone application to be executed on any Java-enabled PC, Mac, and UNIX machine or in a java-enabled browser, with no special downloads, plug-ins or spreadsheet engines required.

BRIEF DESCRIPTION OF THE DRAWINGS

FIG. 1 illustrates the operation of a conventional spreadsheet,

FIG. 2 illustrates the operation of a conventional spreadsheet,

FIG. 5 shows various cell panels, FIG. 6 shows a conventional spreadsheet display, FIG. 7 shows a hidden formula of the spreadsheet of FIG. 6.

DETAILED DESCRIPTION OF PREFERRED EMBODIMENTS

The description in this paper relies on technical terms used in the subjects of object-oriented programming and specially Java programming. For an overview, see e.g., Ken Arnold, James Gosling & David Holmes, The Java Programming Language Addison-Wesley 2000, 3'rd edition ISBN 0-201-70433-1

The embodiment illustrated in the appended figures is programmed in the programming language Java and the system is running on the Java platform. Other programming languages could have been used for the development (e.g. C++ or C#) for a specific platform (e.g. Windows XP or Mac OS).

Figure 4:
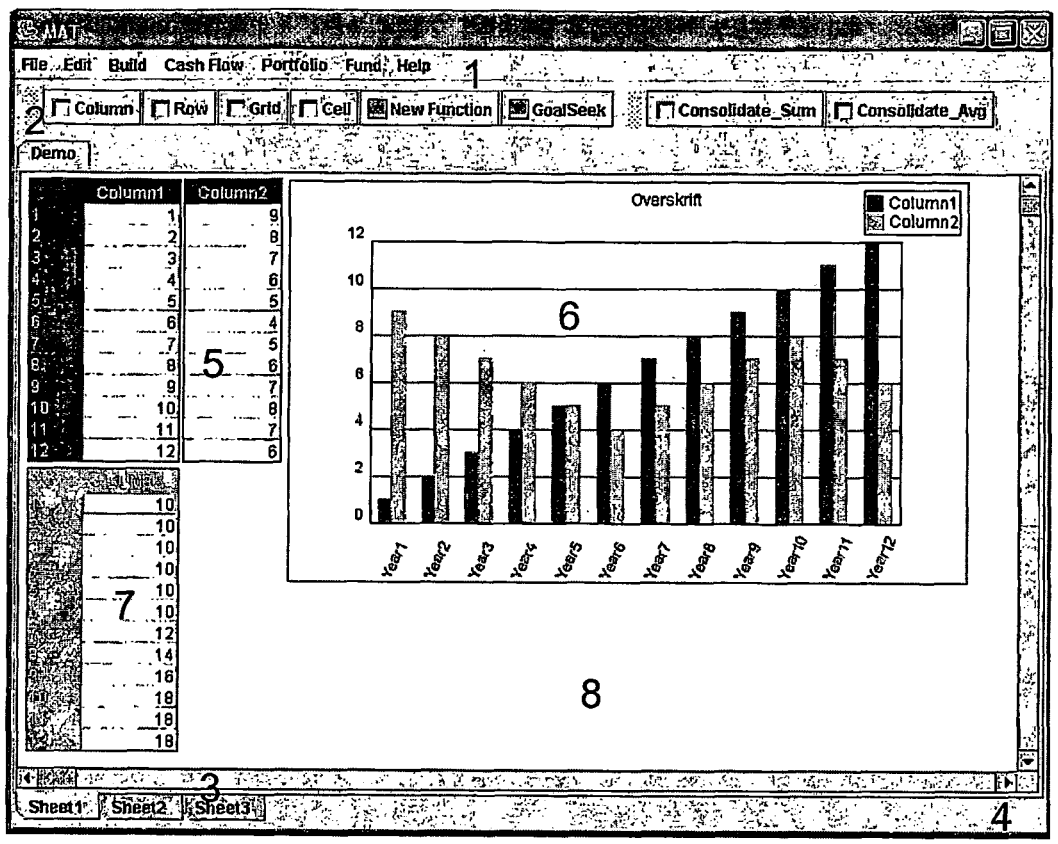
FIG. 4 shows a model according to the present invention as displayed on a monitor.
Figures 5A, 5B:
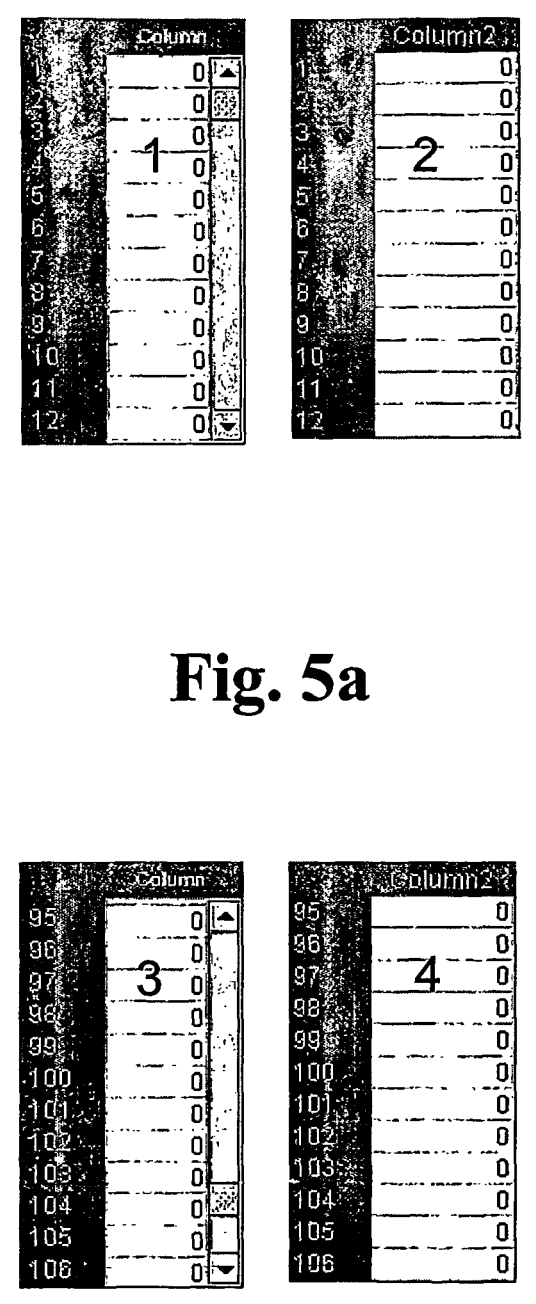

As shown in FIG. 4, the illustrated embodiment of the present invention includes a spreadsheet system having a user interface built of Java graphical user interface components (e.g. windows, drop down menus (4.1), toolbars (4.2), buttons, tabbed panes (4.3), labels, scroll bars etc. (4.4)). In operation, the system provides a number of cell-groups (grid views) organised in panels (FIG. 5a). The system provides means for user input into the cells (e.g., keyboard, mouse, disk, and the like) for storage and processing by the system. The system provides means for building and holding spreadsheet formulas and means for recalculating of formulas and showing the result in the system (4.7). Further, the system provides means for drawing and updating charts (4.6).

In the illustrated embodiment of the present invention, data are stored in cells, which in turn are grouped in panels (FIG. 4.5). A panel can hold one cell, a column of cells, a row of cells or a two-dimensional or a N-dimensional (N≥3) matrix of cells. A cell panel have row labels, column labels and a unique identifier (in the illustrated embodiment of the present invention, a name in the embodiment of a Java String). A cell panel has further a number of attributes to describe the state of the panel (e.g. the visibility of the row and column labels, the colour of the labels and cells, edibility of the cells, number format etc.).

In the illustrated embodiment of the present invention, the number of cells in a cell panel can be greater than the number of visible cells. The system provides means for the user to adjust the number of cells in a cell panel as well as the number of visible cells. Further, the system provides means for attaching a scrollbar to one or a group of cell panels with the purpose of scrolling cells not visible into the visible area of the cell panel. In FIG. 5*a* and FIG. 5*b* it is shown, that the scrollbar in the cell panel Column (5*a*.1) scroll the cells in cell panel Column as well as in cell panel Column 2 (5*a*.2 and 5*b*.4)

In the illustrated embodiment of the present invention, a user creates a cell panel by dragging a cell tool (4.2) from a toolbar and dropping it in the work area (4.8) (the spreadsheet document). The user can edit the attributes of a cell panel in a dialog box and change the location of a panel by moving it with a hardware device (e.g. a mouse or a keyboard).

Figure 6:
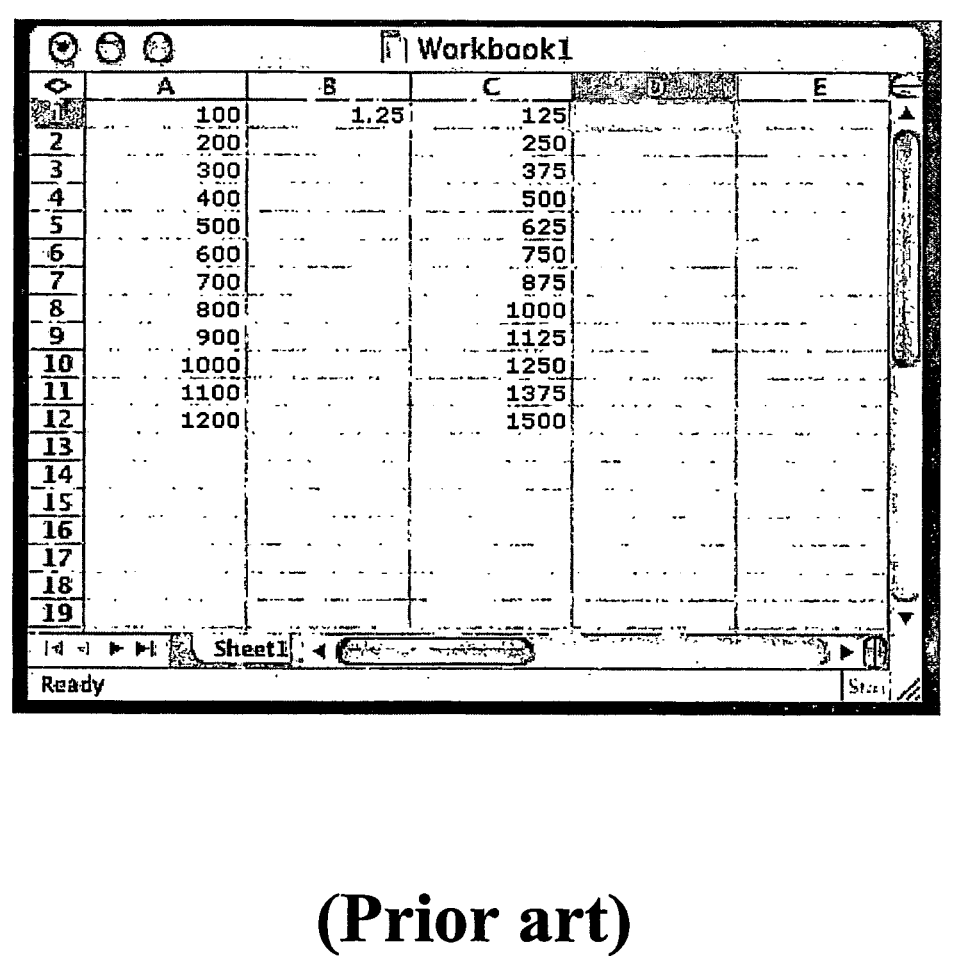

According to the present state of the art, development of spreadsheet models involves working with text based pr. cell formulas either by typing the formula directly in the cells or by using a formula builder, for building text based spreadsheet formulas (for a description se e.g. U.S. Pat. No. 5,603,021). The formulas and raw data (e.g. numeric values) are mixed together in the user interface In FIG. 6 it is shown how data and formulas are mixed together in the cells in a spreadsheet model to obtain a model calculation prices inclusive VAT. Many empty cells in the spreadsheet are provided, but not needed for the spreadsheet model.

Figures 3, 8:
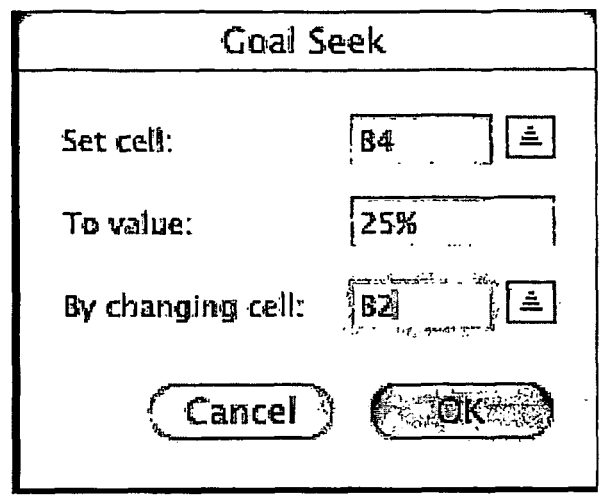
FIG. 3 shows a goal seek dialogue box of a conventional spreadsheet.
FIG. 8 shows other hidden formulas of the spreadsheet of FIG. 6.
Figure 7:
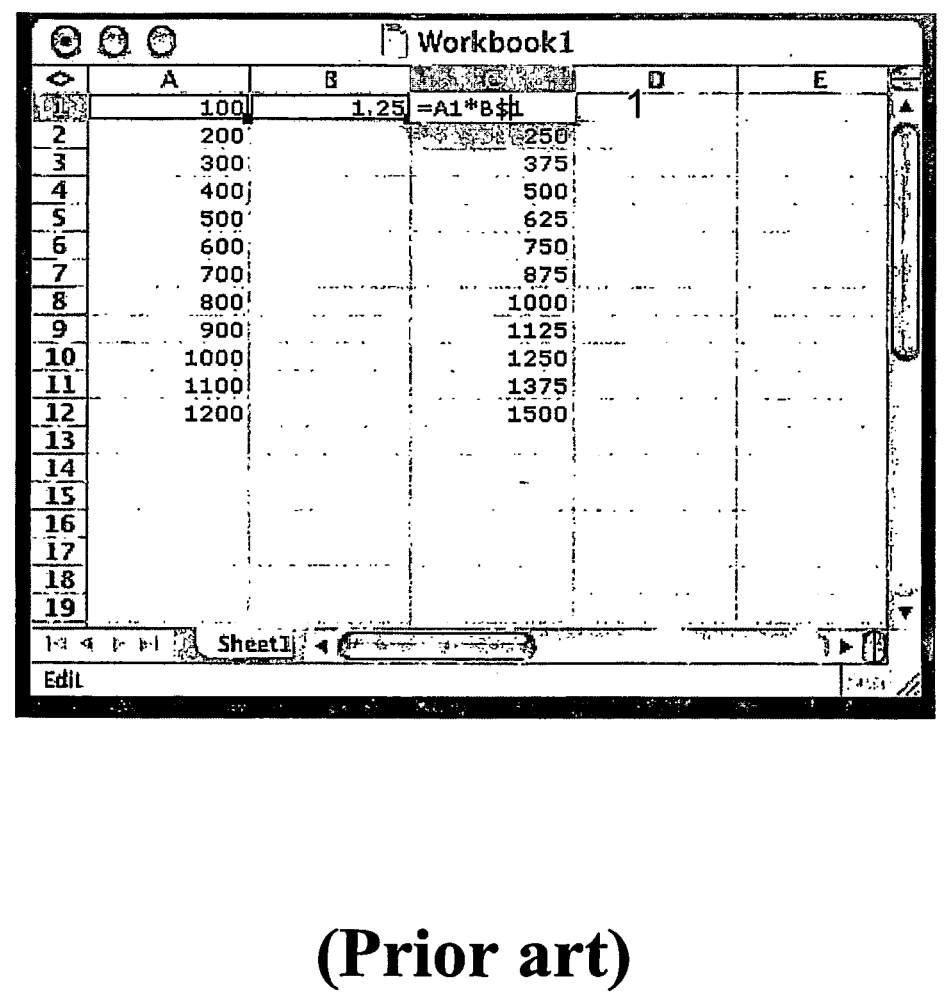

In FIG. 7 it is shown, that cell C1 has a text-based formula entered in the cell. In fact the cells C1 to C12 all have text-based formulas of almost the same appearance, as shown in FIG. 8.

Figure 9:
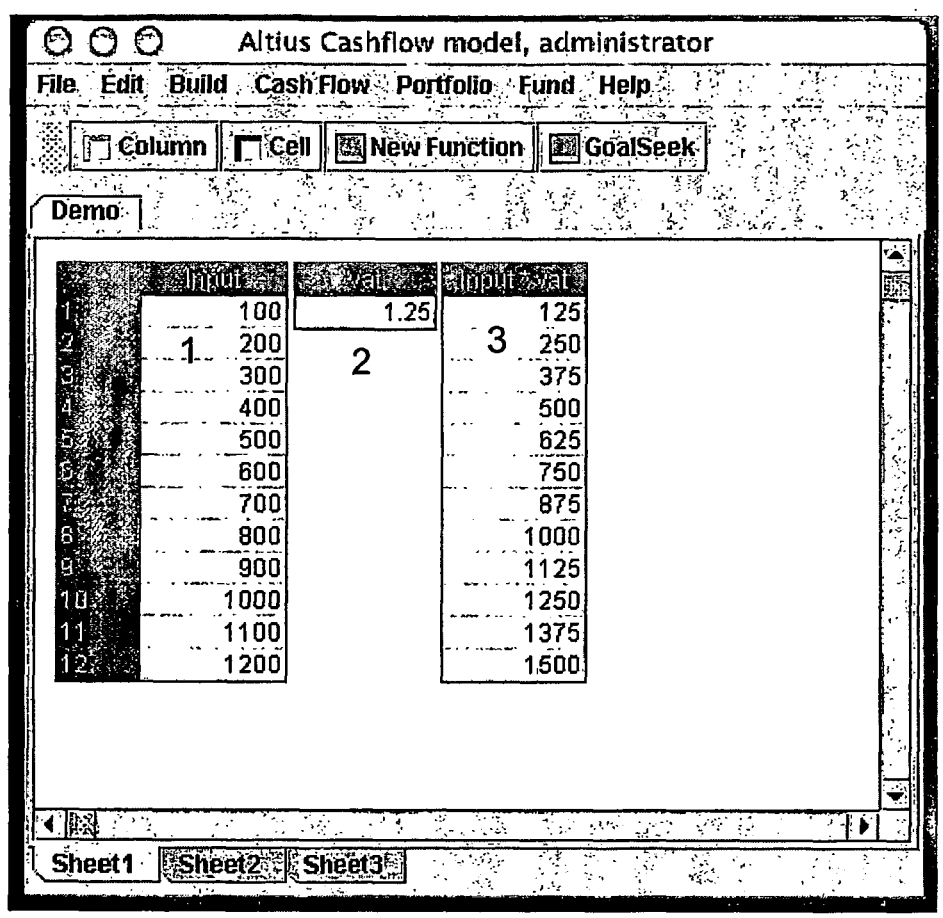
FIG. 9 shows the example of FIG. 6 as modelled according to the present invention.

FIG. 9 shows the same model in the illustrated embodiment of the invention. MAT uses drag and drop techniques to create the number of cells needed for the calculation (25 cells). The cells are grouped in cell panels.

In the illustrated embodiment of the present invention, formulas are not text based but built of software components. A formula can be aggregated by other formula components. To build a formula MAT uses a graphical builder based on drag and drop techniques. Further, a formula in MAT is not associated with a single cell but a complete cell panel. This means that many cells can share the same formula.

Figure 10:
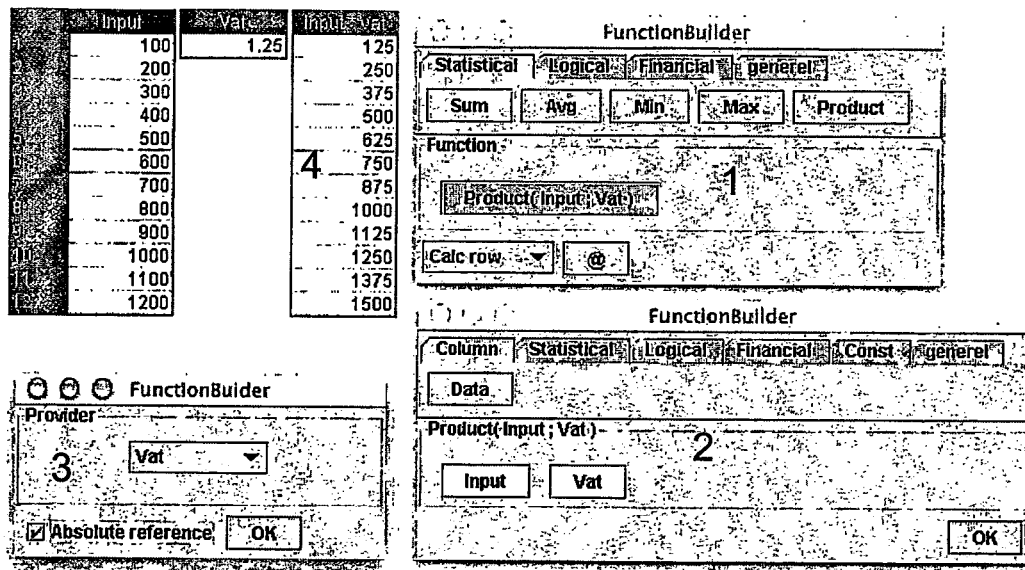
FIG. 10 shows function builder displays of one embodiment of the present invention, FIG. 11 schematically illustrates the architecture of an embodiment of the present invention, FIG. 12 schematically illustrates interfaces and components of an embodiment of the present invention.

In FIG. 10 it is shown that the model has only one formula, which is associated to the cell panel with the column label "Input*VAT" (10.4). All cells in the Cell panel are properly calculated, the type of calculation is performed row by row (10.1) and the cell panel "Vat" provides data as absolute references (10.3)

One of the fundamental problems in the art of spreadsheets is that data and functionality are mixed together in the user interface (7.1).

Figure 11:
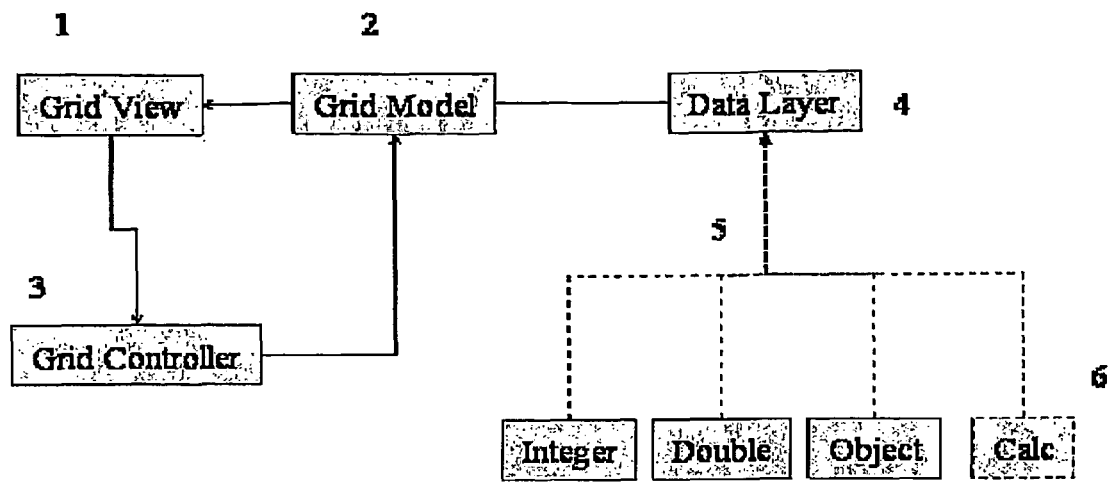

To overcome this problem according to the present invention, the illustrated embodiment uses an extended MVC (Model View Controller) architecture shown in FIG. 11.

FIG. 11 shows the interaction between the components in the MVC architecture. The Grid Model (11.2) passes data to the Cell (11.1). The Grid View determines which events that are passed to the Grid Controller (11.3), e.g. key events, when the user has entered new data into the Grid View or mouse events. The Grid Controller connects the Grid Model with the Grid View and determines how the Grid Model shall react on a specific event.

The Grid Model does not encapsulate the data as in a traditional MVC architecture. Instead the Grid Model has an association to an object of type Data Layer that encompasses the data (11.4). The Data Layer is an abstract class and has in the illustrated embodiment of the present invention four non-abstract subclasses (11.5).

By provision of this extension to the MVC architecture, the data have been separated from the user interface, and during the builder process, it is possible to work interactively with the functionality e.g. changing the kind of data or the type of calculation without disturbing the user interface.

In the illustrated embodiment of the present invention, Data Layer is an abstract class that encapsulates all fields and methods that are common for the specialized Data Layers: Integer Layer, Double Layer, Object Layer, Calc Layer (11.6) etc.

The Double Layer, for instance holds primitive data of type double while the Object Layer can hold mixed data (e.g. data of type String and data of type Integer).

The Calc Layer holds the results of recalculations and will be investigated further in the next couple of sections.

Figure 12:
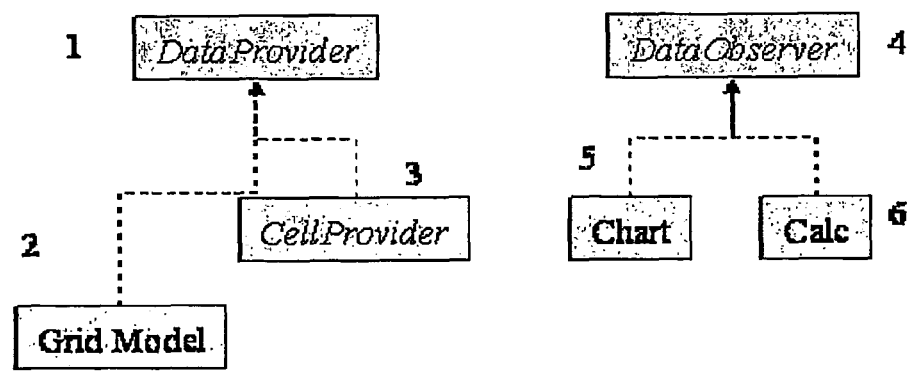

As schematically illustrated in FIG. 12, MAT defines three interfaces that manage the interrelationships between the components, Data Provider (12.1), Cell Provider (12.3) and Data Observer (12.4).

The two interfaces Data Provider (12.1) and Cell Provider (12.3) specify the behaviour for components that can have dependent components (e.g. a cell panel can provide input for a chart. Whenever the data in the cell panel changes, the chart needs to be repainted). A Data Provider is used when a complete cell panel provides data and a Cell Provider is used when only part (e.g. a single cell or a group of cells) of a cell panel provides the data.

In the illustrated embodiment of the present invention, components that can have dependent components must implement one of these interfaces.

Components that are dependent on other components (e.g. can be recalculated or repainted) must be of type Data Observer (12.4). The illustrated embodiment defines the interface Data Observer to specify behaviour for components that can react on changes in components of type Data Provider.

Both the Calc (12.6) component and the Chart (12.5) component implements the Data Observer interface.

Spreadsheet formulas are fundamental to the creation and operation of a spreadsheet data model. In the state of the art, during creation of a particular traditional spreadsheet or worksheet model, a user enters formulas as text in spreadsheet cells the same way he or she enters values and labels.

A spreadsheet formula has a specific syntax defined by the spreadsheet producer. A formula begins with a special token (e.g. =in Excel) to distinguish the formula from raw data, followed by tokens as cell references (e.g. C1), operators (e.g. +−/), values, and built in functions (e.g. SUM(C1: C12)). Required arguments to a built-in function must be enclosed in parentheses. Multiple arguments must be separated by a semicolon, or other argument separator (as specified by the implementation). Further, multiple arguments must be entered in a specific order. If an optional argument is specified for a built-in-function, the user must also specify all preceding optional arguments for the function. If a user fails to follow the specified format for entering a built-in function formula, a spreadsheet system will refuse to process the formula further and, instead, display a syntax error message.

In general, users must adhere to the following prescribed format for functions:

FUNCTION_NAME (Argument 1; Argument; . . . )

The type of information to be provided as arguments depends on the specific built-in function. Arguments can be divided into three general types: numeric values, matrix values, and string values (text). Most arguments require one of these types of values. Some accept a combination or a choice of types. For instance, SUM and other statistical functions accept a "list," which can be a matrix value (i.e., cell coordinates e.g.: C1:C20) used alone or with numeric values.

Users can use more than one built-in function in a single formula, with one built-in function serving as the argument or parameter to another built-in function. This is called "nesting" functions. Generally, a user can nest as many functions as desired, several layers deep. For example, the following calculates the average values in cell matrix C14 . . . F24, then rounds the average to two decimal places:

=ROUND(AVG(*C*14:*F*24),2)

Nested functions evaluate from inside out. In the above example, for instance, the AVG is calculated before the ROUND.

When formula syntax and arguments are correct, most built-in functions and formulas evaluate to a numeric value (including dates) or string value (label or text). If a value cannot be calculated, a spreadsheet "ERR" value is returned thereby indicating an error condition.

Figures 13, 14:
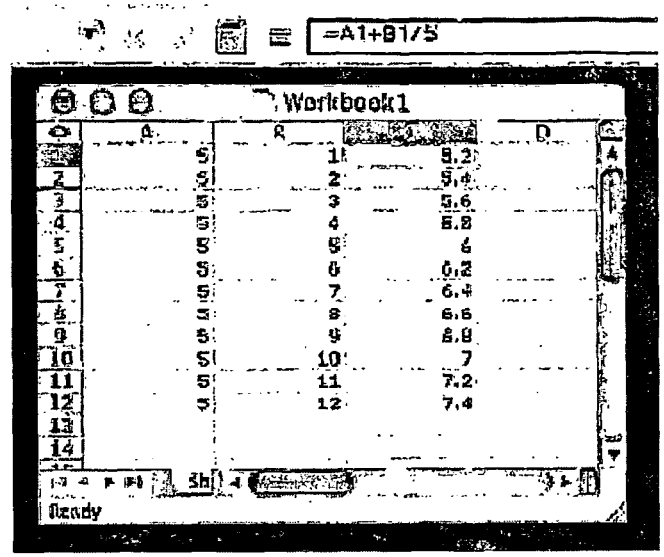
FIG. 13 shows an Excel spreadsheet.
FIG. 14 shows hidden formulas of the spreadsheet in FIG. 13.

In FIG. 13 a typical Excel spreadsheet model is shown. The cells A1 to A12 and B1 . . . B12 hold some data, while the cells C1 . . . C12 hold formulas.

In the state of the art the evaluation of formulas (shown in FIG. 14) will not be based directly on the formulas entered by the user, but on a "Reverse-Polish Notation" (RPN) or "postfix" format. Before recalculation the spreadsheet system converts the formulas to (RPN) format: E.g. the formula A1+B1/5 entered by the user as text is converted to

A1B1 5/+ (13)

As the RPN indicates, the / operator has higher precedence than the + operator. According to this the term B1/5 will be evaluated first and the result of this division will be added to value hold in cell A1.

The RPN format will make it possible for a traditional spreadsheet system to carry out a stack based recalculation. The internal representation of the formula in RPN format may be in so called "p-code" or opcodes, easy to convert back into text strings ("de-parsed") for easy on-screen editing of formulas by the user.

In general in the state of the art, a spreadsheet system holds a so called spreadsheet engine able to 1) parse a spreadsheet formula entered by the user as text to the internal representation 2) de-parse the internal representation back into a text string readable for the user 3) sort the cell dependency into a specific recalculation order (e.g. natural recalculation order) and 4) evaluate the formula to a numeric value (including dates) or string value (label or text) to be shown in the spreadsheet at the specific cell location. If a value cannot be calculated, a spreadsheet "ERR" value is returned thereby indicating an error condition.

According to the present invention a spreadsheet formula is constructed of software building blocks, which resemble the LEGO building blocks for children. In MAT a spreadsheet formula can consists of one or many software-building blocs. A spreadsheet formula can be constructed by software components in much the same manner children builds houses of LEGO blocks by placing building blocks side by side or on top of each other. A software building block represents 1) a function (e.g. a sum function)—then called a software function building block—able to perform calculation on data input or 2) fundamental data (e.g. holding a reference to a cell panel or a reference to a constant value)—then called a software data building block.

According to the present invention it is further possible to embed one or many software building blocks into software function building blocks and thereby nest the building blocks. Nested building blocks can be software function building blocks and/or software data building blocks. The outer building block then acts as a container for the nested building block(s). The nested building block(s) makes up input data for the container building block.

After the construction of a formula in MAT, the formula is 1) associated with a cell panel, which then shows the result of the calculation and/or 2) stored in a library of user-defined formulas.

Figure 15:
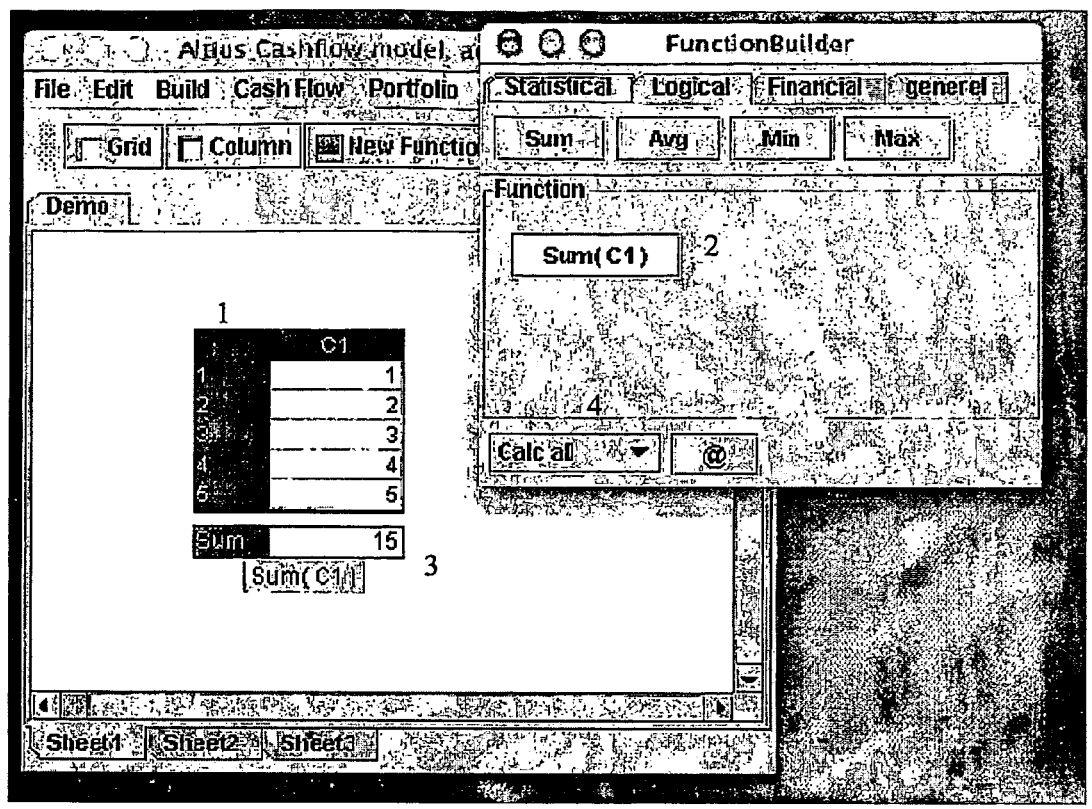
FIG. 15 shows a function builder display example according to the present invention, FIG. 16 schematically illustrates a relation between a cell panel and a function.

A formula in MAT can consist of a function, e.g. a Sum function, which sums all the cells in a cell panel (FIG. 15*a*.1) C1. The formula is constructed by the software function building block (15*a*.2) representing a sum function. Embedded in the function is a software data building block with a reference to the cell panel C1. The formula is associated to the cell panel (15*a*.3), which shows the result of the calculation. Further the formula sums all cells in the embedded software data building block and shows the result in one cell. The type of calculation is specified to calc all (15*a*.4). Calculation types will be specified below.

Figure 16:
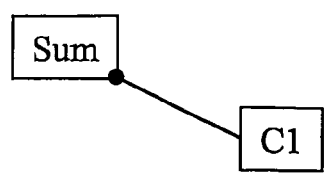

FIG. 16 shows the software function building block representing a sum function with an association to the software data building block representing the cell panel C1.

Figure 17:
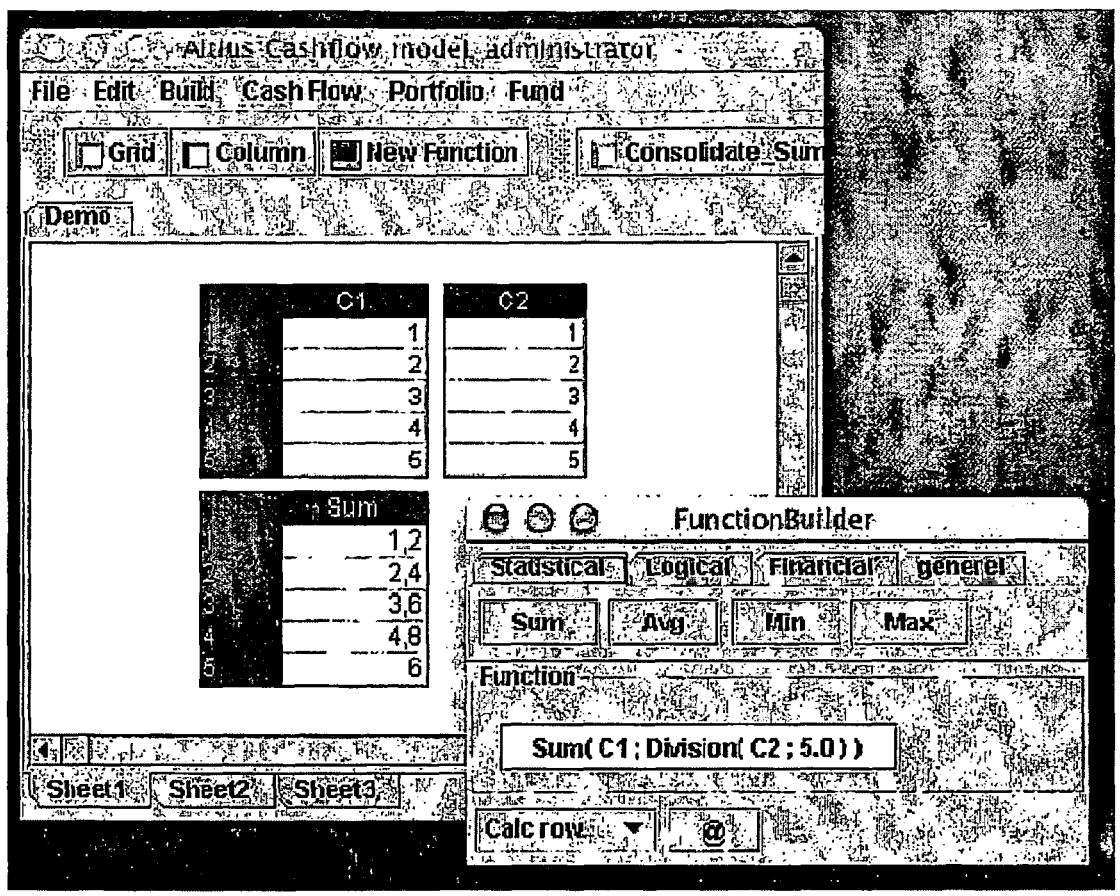
FIG. 17 shows another function builder display example according to the present invention.

A software function building block can further have embedded software function building blocks as shown in the next example (FIG. 17). Two cell panels C1 and C2 hold input data and a cell panel Sum holds output data generated by the formula.

The formula (17.4) is built of a software function building block representing a Sum function and two embedded software building blocks. The first is a software data building block having a reference to the cell panel C1 (17.1) and the second is a software function building block representing a division function. The division software function building block has two embedded software building blocks. The first is a software data building block having a reference to the cell panel C2 (17.2). The second is a software data building block having a reference to a const value 5.0.

The formula (17.4) is performing the calculation in rows as specified by the dropdown menu (17.6). The meaning of this is that the calculation is performed row by row starting from the top (e.g. the value in the first cell in C1 is added to the value in the first cell in C2 divided by 5 (1+1/5=1.2 and the result is placed in the first cell in the Sum cell panel) then the second cell in C1 is added to the value in the second cell in C2 divided by 5 (2+2/5=2.4 and the result is placed in the second cell in the Sum cell panel etc.)

Figure 18A:
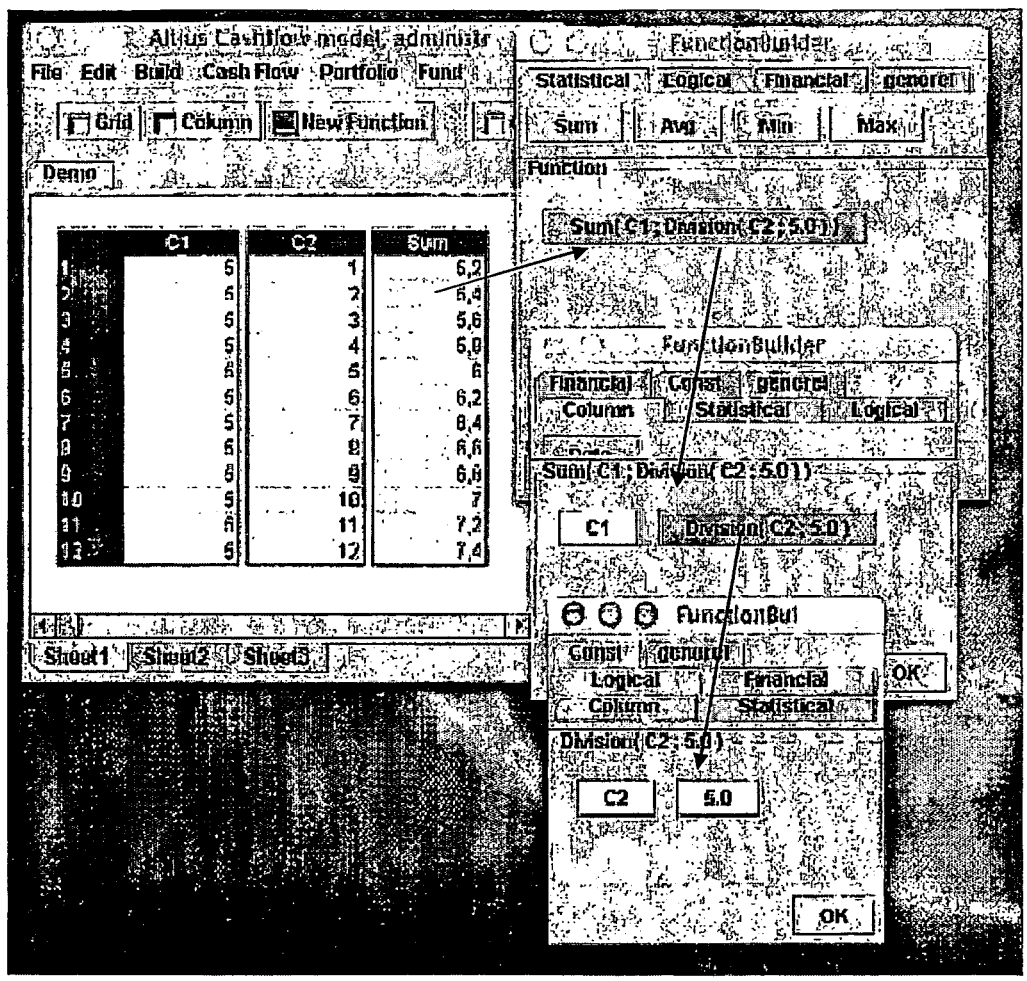
FIG. 18 shows yet another function builder display example according to the present invention and the architecture of the function, FIG. 19 schematically illustrates JAVA building blocks of an embodiment of the present invention, FIG. 20 schematically illustrates different layers of an embodiment of the present invention, FIG. 21 schematically illustrates JAVA classes of an embodiment of the present invention, FIG. 22 schematically illustrates JAVA objects of an embodiment of the present invention.
Figure 18B:
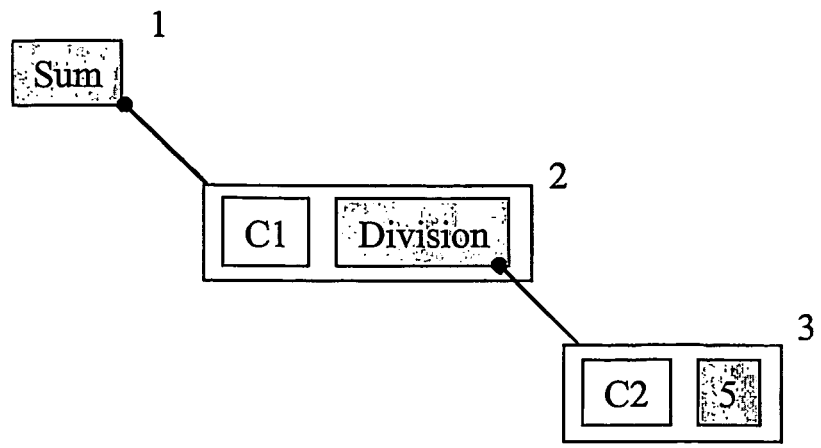

FIGS. 18*a* and 18*b* shows the architecture of the formula. The Sum software function building block (18*b*.1) has two embedded software buildings blocks (18*b*.2). The second of these buildings blocks is another software function building block with two embedded software building blocks (18*b*.3).

Figure 19:
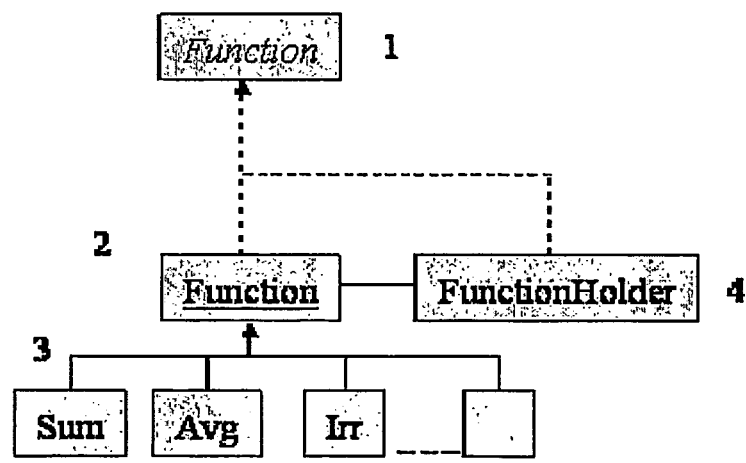

In one embodiment of the present invention, a Java interface Function (19.1) is provided, as illustrated in FIG. 19, to define the behaviour for calculation in the system. Further an extendable abstract Java class Function (19.2) is provided. The class implements the interface Function and defines the behaviour for built-in functions in the system. All built-in functions (19.3) in the illustrated embodiment extend the abstract class Function.

The system provides further a Java class Function Holder (19 4), able to contain/hold software building blocks. The class further has an object reference to an object of type Function. Objects of type Function Holder can thus act as a built-in function and carry out calculations.

All spreadsheet formulas in the illustrated embodiment of the present invention are of type Function.

After the construction of a formula in MAT, the formula is associated with a cell panel, which then shows the result of the calculation and/or stored in a library of user-defined formulas.

In the illustrated embodiment of the present invention, an association of a formula to a cell panel is done by utilization of the extended MVC architecture. In FIG. 11 the association (object reference) from the Grid Model (11.2) to the Data Layer (11.4) is set to type Calc.

Figure 20:
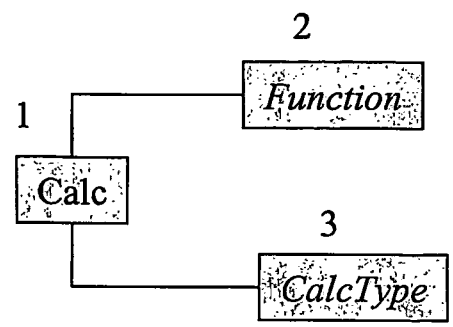

As schematically illustrated in FIG. 20, the Calc layer is a special Data Layer having an association (object reference) (20.2) to an object of type Function. By this object reference the calc layer holds a formula and through the mechanism of the extended MVC architecture the result of a calculation is shown in the cell panel.

Figure 21:
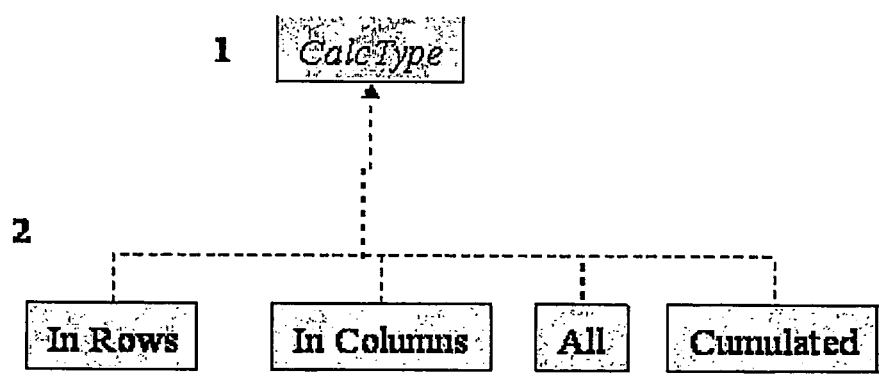
Figure 22:
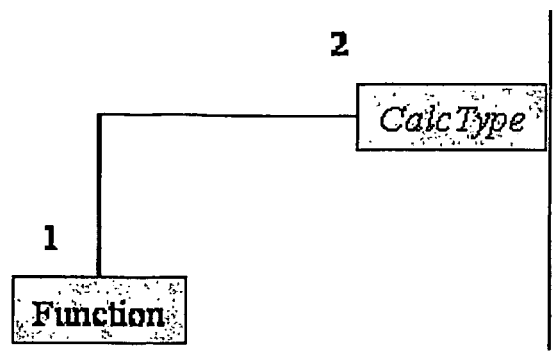

The type of calculation performed by a specific formula is specified by the calc layer and implemented as an association (object reference) (20.3) to an object of type Calc Type (21.1) as schematically illustrated in FIG. 21. In the illustrated embodiments of the present invention, the Calc Type is a Java interface. The system defines a number of Java classes that implements the Calc Type interface (21.2).

In the illustrated embodiment of the present invention, each function can have an associated private calc type specified by an object reference from an object of type Function (22.1) to an object of type Calc Type (22.2). If no special Calc Type is provided for a function the object reference (22.1) is set to null, and the Calc Type of the function will be the same as specified by the Calc Layer. The default Calc Type for the Calc Layer is "in rows" and cannot be null. The Calc Type for a function has higher precedence than the Calc Type for the layer.

Figure 23:
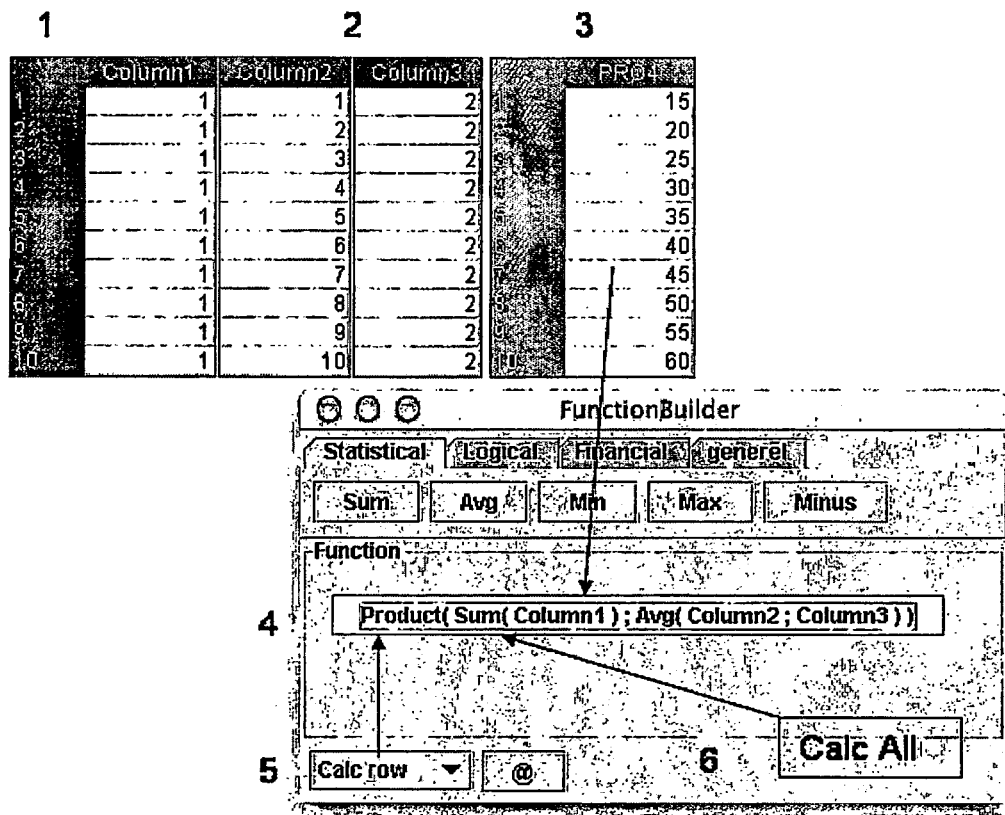
FIG. 23 shows a function builder display example according to the present invention.

In the illustrated embodiments of the present invention, a formula built of a number of functions can in the process of calculation carry out different calculations types. FIG. 23 shows an example.

The cell panel PRO4 (23.3) displays the result of the calculation of the formula (23.4). The formula combines three functions: 1) Product 2) Sum and 3) Avg. The calc type associated with the calc layer is calc row (calc in rows). To the Sum function there is further assigned a private calc type Calc All (23.6). As the Product and the Avg functions have no assigned private Calc Type, the calculation of these functions will be in rows, specified for the Calc Layer (23.5).

The value (15) in the first cell in the cell panel PRO 4 (23.3) is a result of the calculation Product (10; 1.5) that evaluates to 15. The first argument, 10 is a result of the calculation Sum (Column 1) as the calc type of the Sum function is Calc All (23.6) and all the cells in Column 1 is added to one value. The second argument 1.5 is a result of the calculation Avg (the value in the first cell of Column 2; the value in the first cell of Column 2) equal to Avg (1;2).

The value (20) in the second cell in the cell panel PRO 4 (23.3) is a result of the calculation Product (10; 2) that evaluates to 20. The first argument 10 is a result of the calculation Sum (Column 1) as described above. The second argument 2 is a result of the calculation Avg (the value in the second cell of Column 2; the value in the second cell of Column 3) equal to Avg (2;2). Etc.

The evaluation of a formula, in the illustrated embodiment of the present invention, is a simple traverse of the arguments left to right. The user will evaluate the formula directly on the formula built. The formula does not need to be converted to a RPN notation before evaluation.

Figure 25:
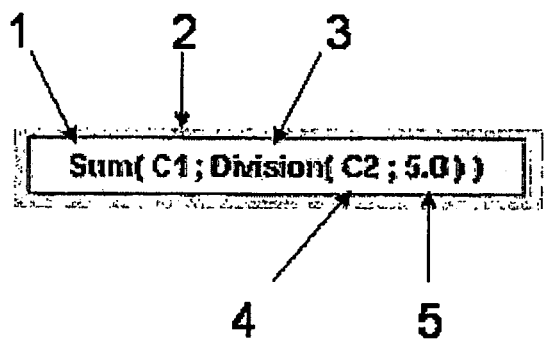
FIG. 25 shows a function created with one embodiment of the function builder according to the present invention.
Figure 24:
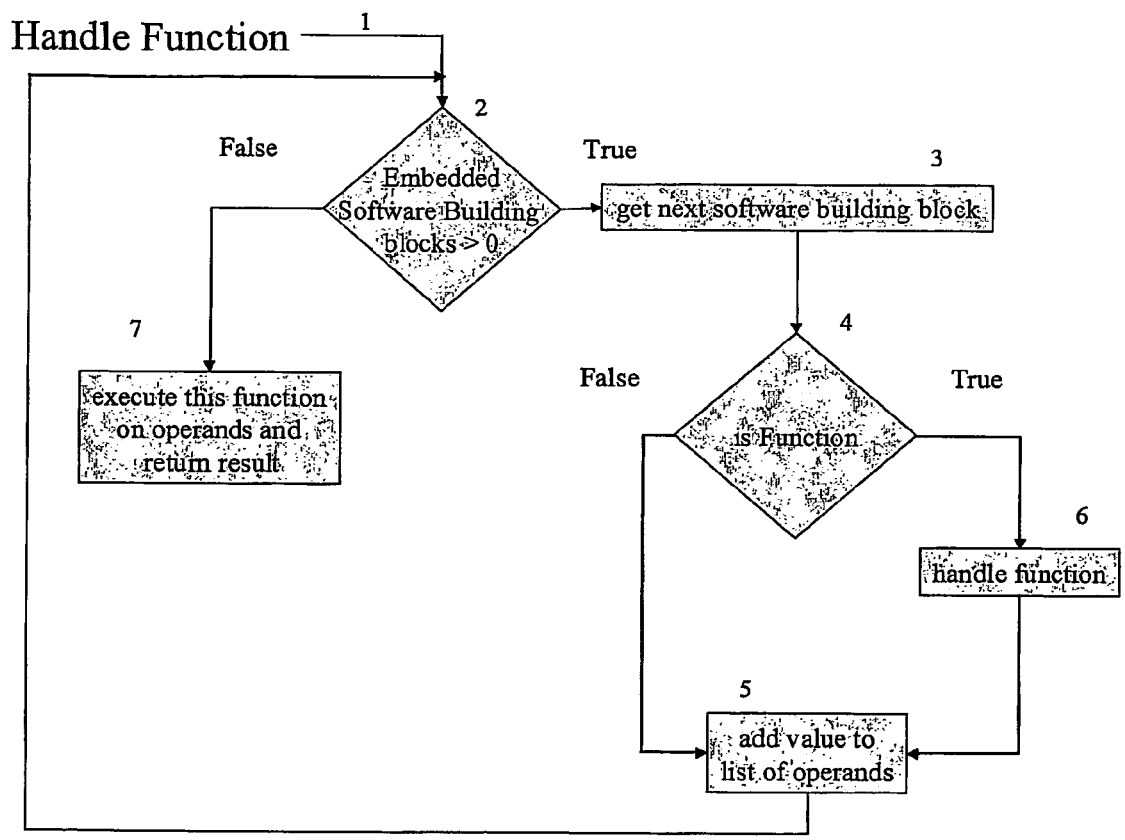
FIG. 24 shows a flow chart of calculation of an output value of a function according to the present invention.

A Formula evaluation, in the illustrated embodiments of the present invention, is done by a procedure called "Handle Function." FIG. 24 shows a flow chart of formula evaluation of the illustrated embodiment of the present invention:

Let us follow the flow chart (FIG. 24) to evaluate the formula shown in FIG. 25. The formula is built of a software function building block representing a Sum function (FIG. 25.1) with two embedded software building blocks (25.2) and (25.3).

The evaluation of the formula starts by making a call to the procedure Handle Function in (24.1). Let us name this procedure call, the outer procedure. The task for this procedure is to evaluate the outer software function building block, representing the Sum function (FIG. 25.1). The evaluation moves to (24.2). Since the software function building block has two embedded software building blocks the decision in (24.2) is set to true and the evaluation moves to (24.3). At this point the procedure gets the next software building block (C1 in FIG. 25.2) and moves to (24.4). As the software building block (FIG. 25.2) is a software data building block the decision in (24.4) is set to false and the data building block is added to the list of operands (24.5). The evaluation proceeds to 24.2. As one more embedded software-building block is present (FIG. 25.3) the evaluation get hold of this building block (24.3) and moves to (24.4). The decision in (24.4) is set to true, as this building block is a software function building block. The evaluation then moves to (24.6). At this point a new call to the procedure Handle Function is made. Let us name this procedure call, the inner procedure. The task for this inner procedure is to evaluate the inner software function building block, representing the Division function (FIG. 25.3). The inner procedure starts in (24.1) and moves to (24.2) in order to check the number of embedded software building blocks. As the software function building block has two embedded software building blocks (FIGS. 25.4 and 25.5) the decision in (24.2) is set to true and the evaluation moves to (24.3) where it gets the next software building block (25.4). The evaluation moves to (24.4) in order to determine the type of the actual software building block. The type of the software building block is a software data building block (FIG. 25.4) and the decision in (24.4) is set to false and the data building block (C2 in FIG. 25.4) is added to the list of operands (24.5). The evaluation proceeds to 24.2. Since one more embedded software block is present the evaluation gets the next building block (24.3) and moves to (24.4). The new software building block is also a software data building block and is added to the list of operands and the evaluation moves to (24.2). As no more embedded software building blocks are present the evaluation moves to (24.7). The software function building block executes the function it represents (Division) on the operands which is found in the list of operands and the result of the inner Handle Function procedure is returned to the outer Handle Function procedure. The result is returned in (24.5) of the outer procedure and added to the list of operands.

The outer procedure continues the evaluation and moves to (24.2). No more embedded software building blocks are present and the evaluation moves to (24.7). The software function building block executes the function it represents (Sum) on its operands and the result is returned. As the software function building block representing the Sum function is the outer software building block the result of the evaluation is returned to the cell panel, it is associated with (e.g. Sum in FIG. 18).

The work process of creating a spreadsheet model (e.g. a financial model) typical involves setting up data and building formulas, re-building formulas, changing the position of the data and formulas, setting up charts etc.

In the illustrated embodiment of the present invention, a formula is built of software building blocks included in the actual model by drag and drop techniques.

Figure 26:
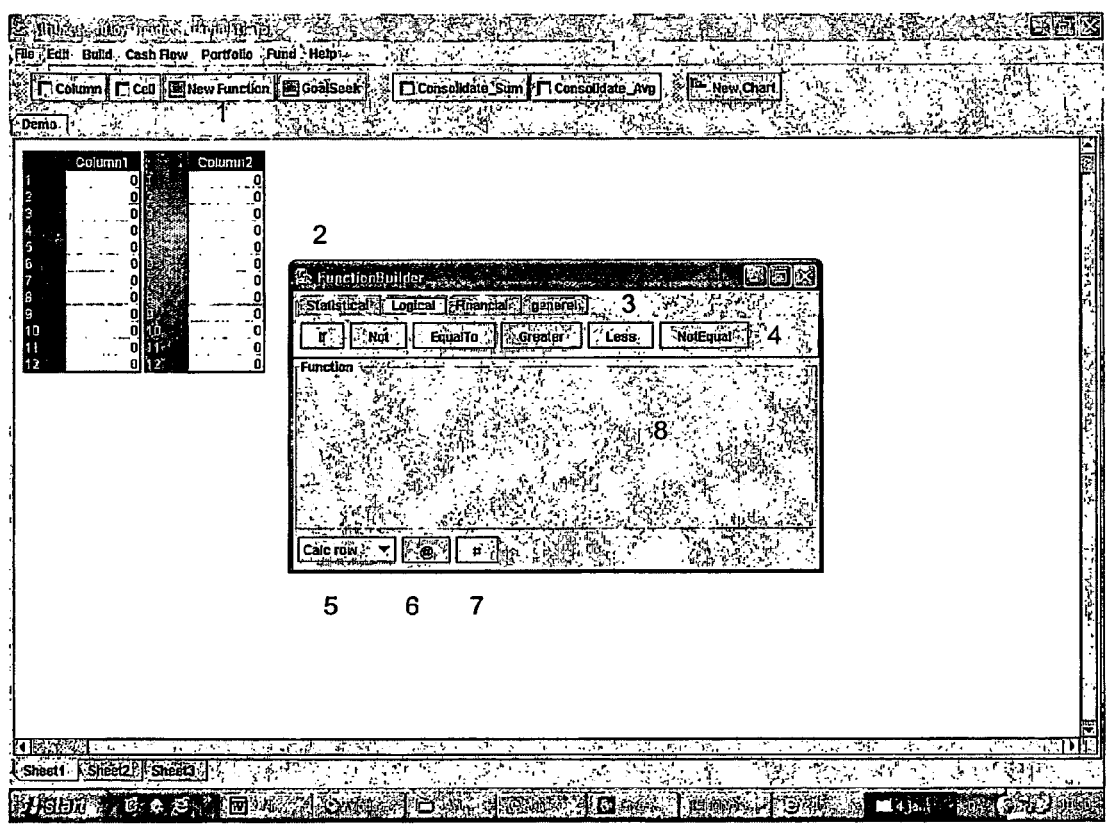
FIGS. 26-34 illustrate the process of creating a function with one embodiment of the function builder according to the present invention.

To be able to build formulas, the illustrated embodiments of the present invention provides a visual tool for building formulas or functions (FIGS. 26 and 38) Formula Builder or function builder. In the illustrated embodiment in FIG. 26, the Formula Builder is a javax.swing dialog (26.2), which is opened by a click on the Function tool in the tools palette (26.1).

The Formula Builder includes a Tabbed Pane with a number of tabs to organise the different types of built-in functions (e.g. Statistical and Logical) (26.3). On each tab pane the software function building blocks that represent the built-in functions are placed (26.4) able to be dragged into the work area of the Formula Builder (26.8). The Formula Builder further includes a tool (26.5) to specify the calculation type of the formula, (26.6) a tool to associate a formula with a cell panel and (26.7) a tool to store a formula in a library.

Figure 27:
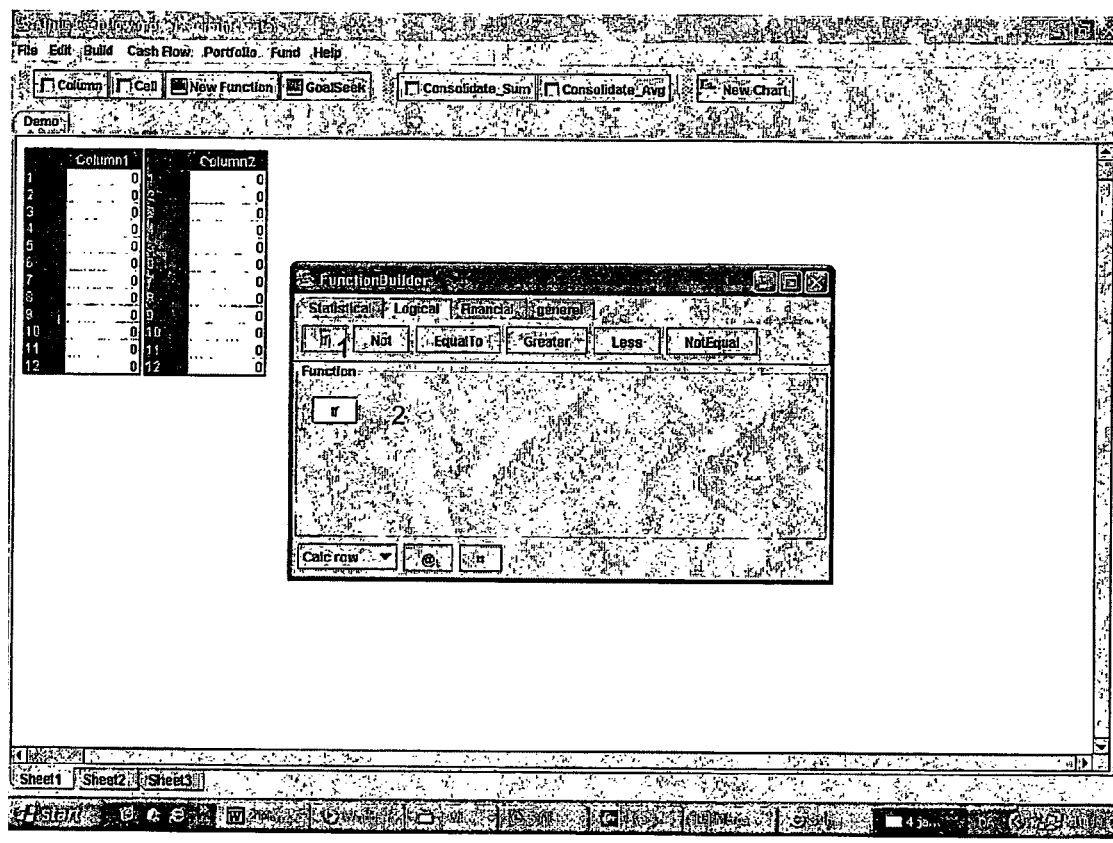
Figure 28:
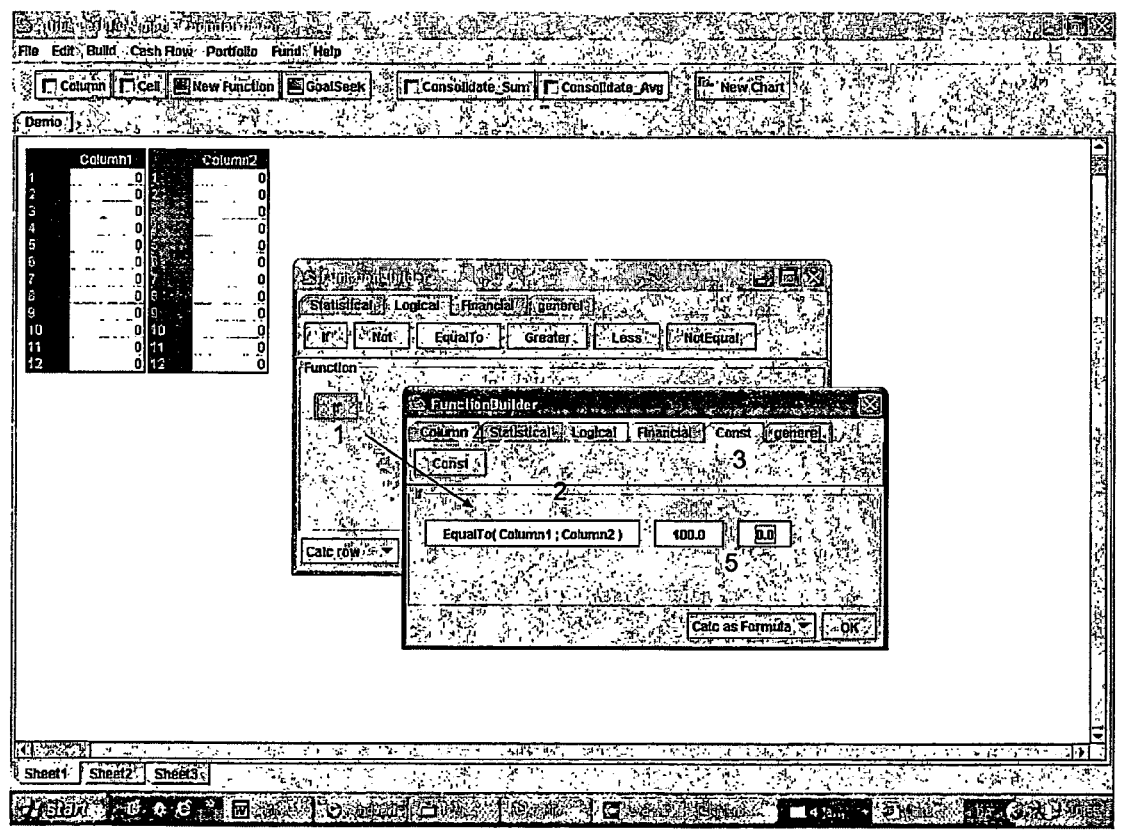
Figure 29:
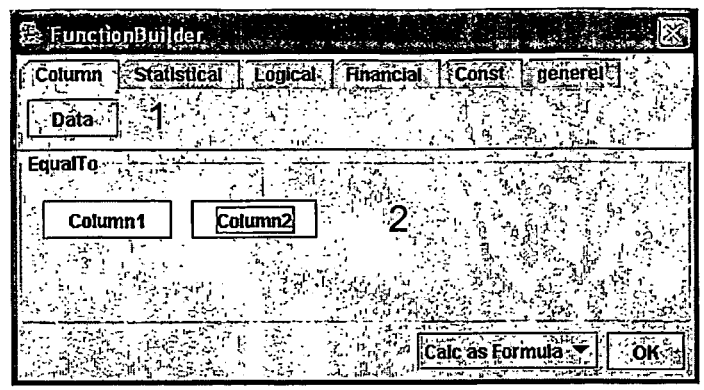

To build a new formula the user drops a function into the work panel (FIGS. 27.1 and 27.2)

The user can embed software building blocks into a function. With a mouse click (or another input device e.g. a keyboard) a new dialog box is opened to represent the internal of the function (28.2). In this "inner" dialog box most of the same tools are available as in the "outer" dialog box. A work area is provided (28.2) into where the user can drag software building blocks. In the illustrated embodiment, two extra tab panes are provided (28.3 and 28.4). In the tab pane "Const" a software data building block is provided to add constant values to a formula (28.5).

In the tab pane "Column" a software data building block is provided to add software data building blocks that represent cell panels in the spreadsheet model to a formula (29.2).

Figure 30:
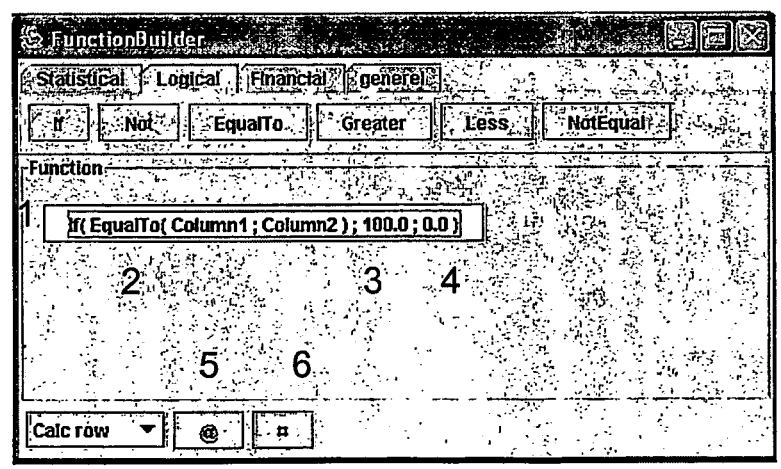
Figure 31:
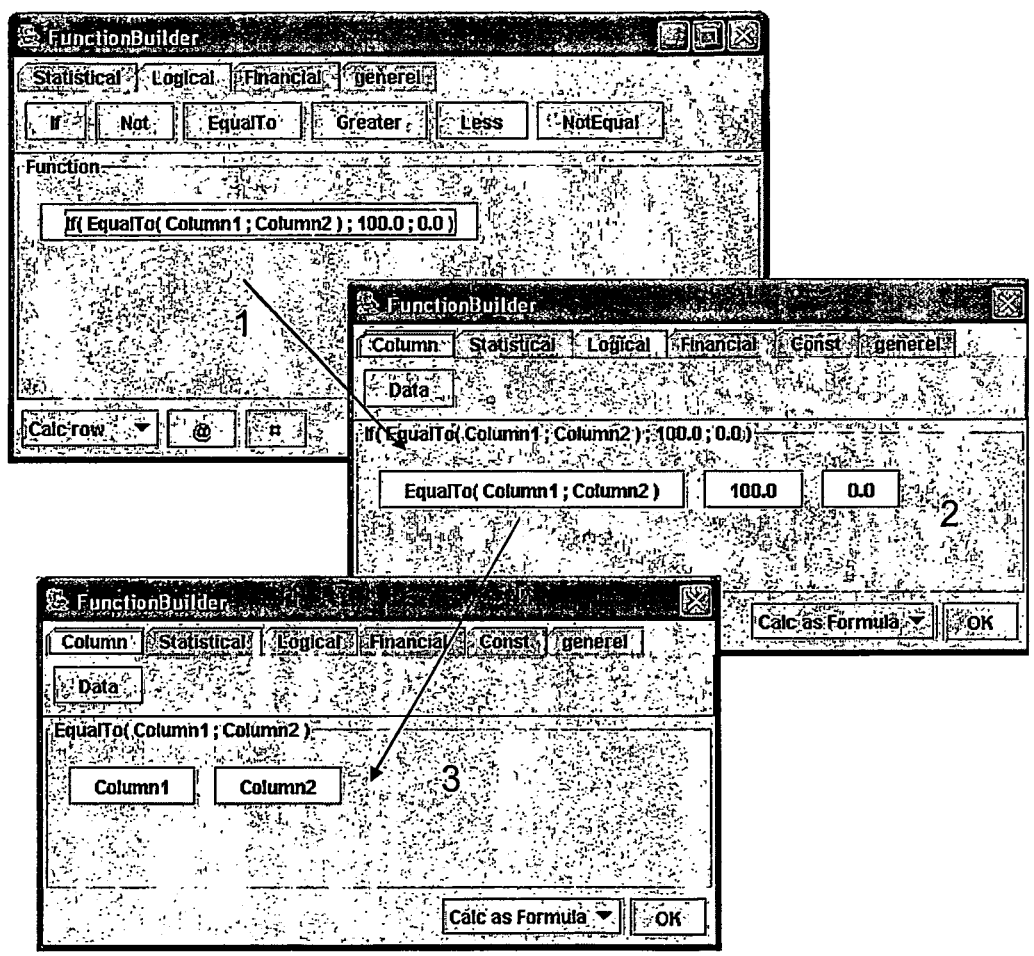

In FIG. 30 the complete formula is displayed. The "outer" software function building block representing an "If" built-in function (30.1) has three embedded software building blocks as schematically illustrated in FIG. 31 window 2. A software function building block representing an Equal To built-in function (30.2) and two software data building blocks (30.3 and 30.4). The "inner" software function building block representing an Equal To built-in function (30.2) has two embedded software data building blocks as illustrated in FIG. 31 window 3.

The user can associate the formula with a cell panel in the spreadsheet model by clicking on the button 5 in FIG. 30 or the user can store the formula in a library of user-defined formulas by clicking the button 6 in FIG. 30.

Figure 32A:
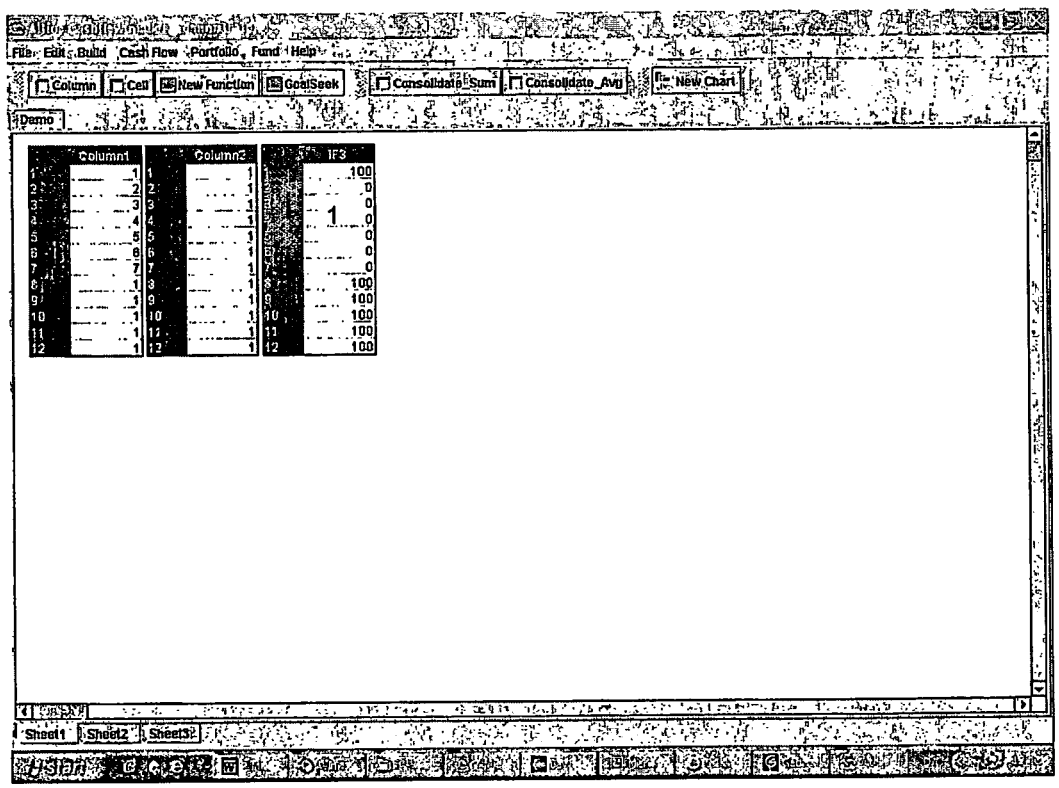
Figure 32B:
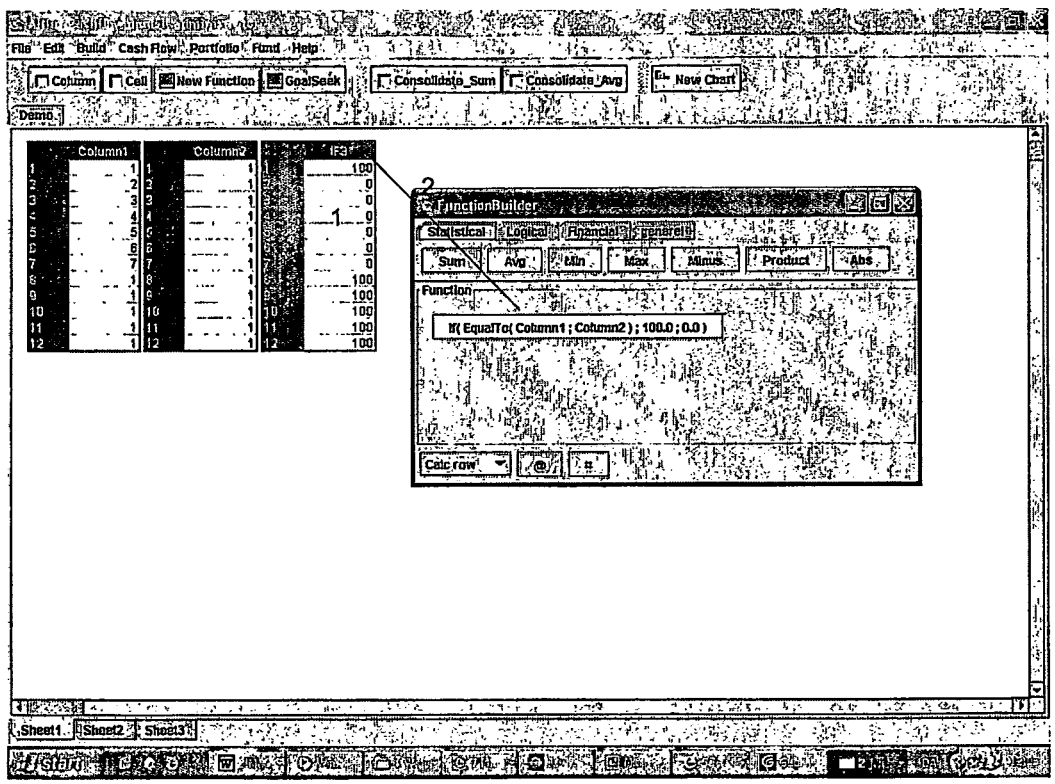

In FIG. 32a the cell panel associated with the formula is shown (32a.1). In the illustrated embodiment of the present invention, the user can open the Formula Builder by double clicking on the cell panel (32b.1). In this way the user can be built the formula.

Figure 33A:
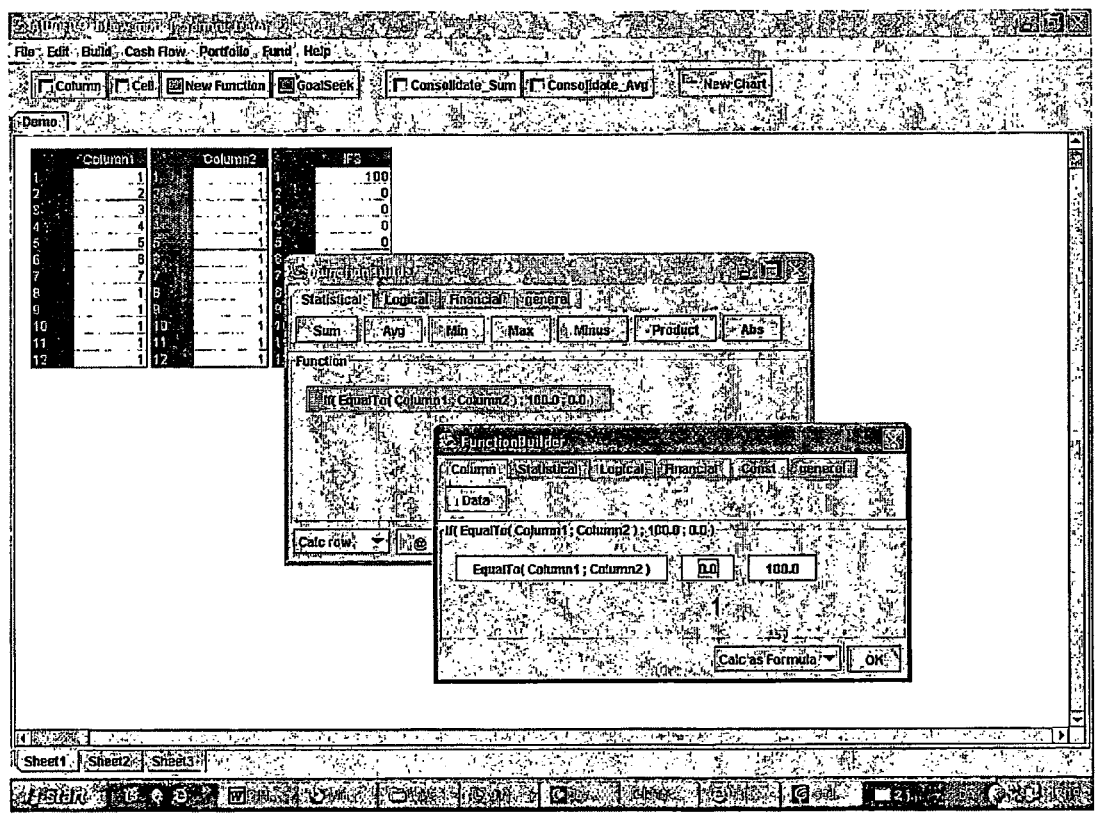
Figure 33B:
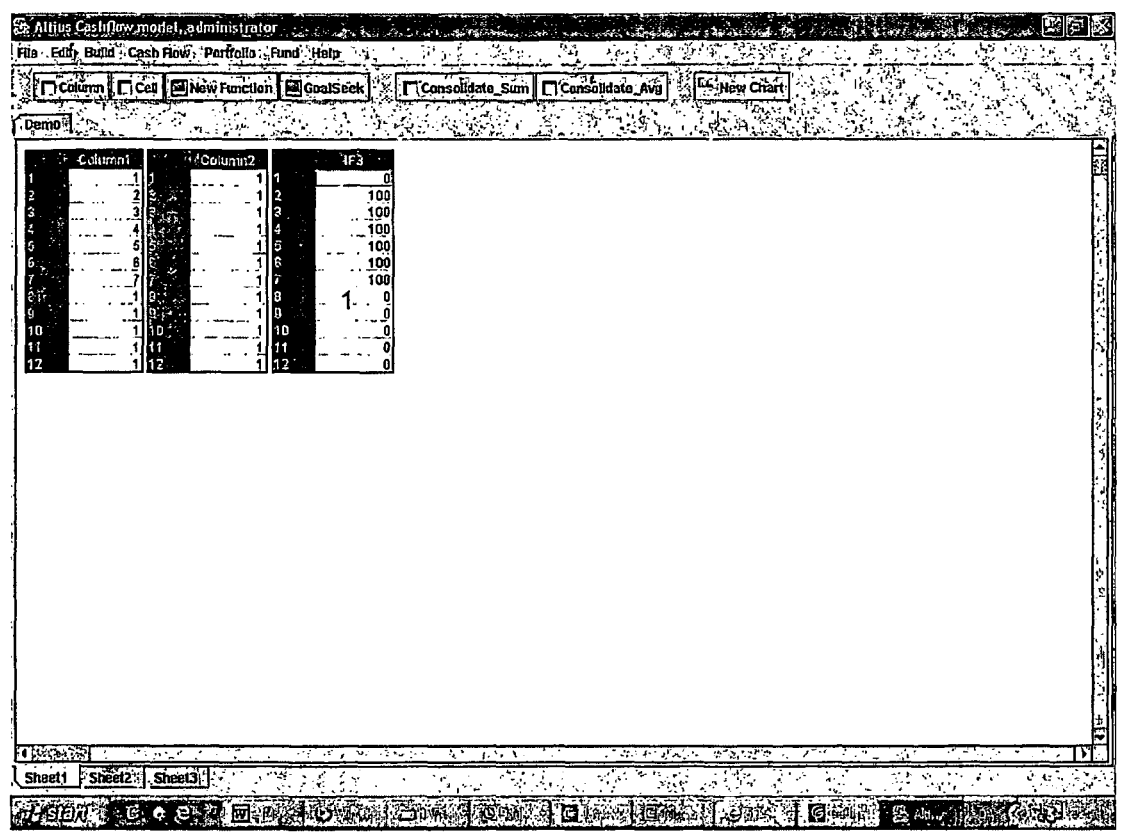

As an example the user can reorder the embedded software building blocks in the formula, cf. FIG. 33a, item 1 by dragging and dropping the software building blocks. The result is shown in FIG. 33b, item 1.

Figure 34:
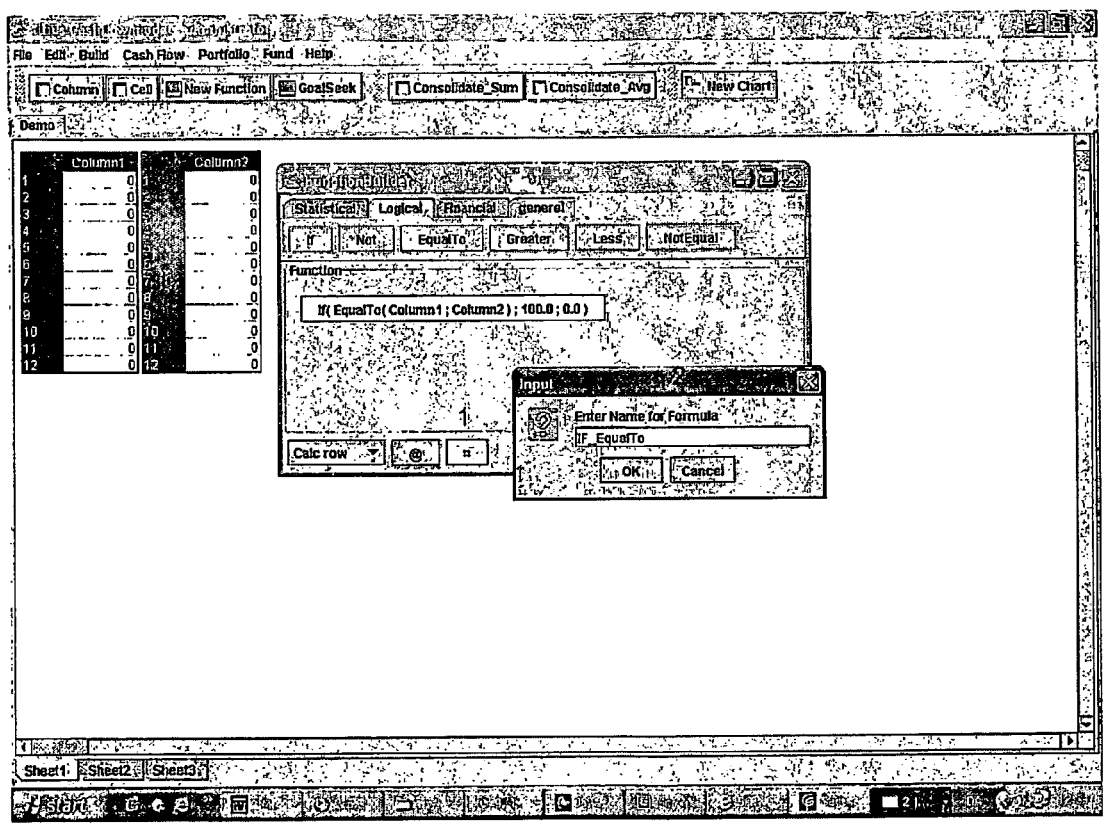
Figure 35:
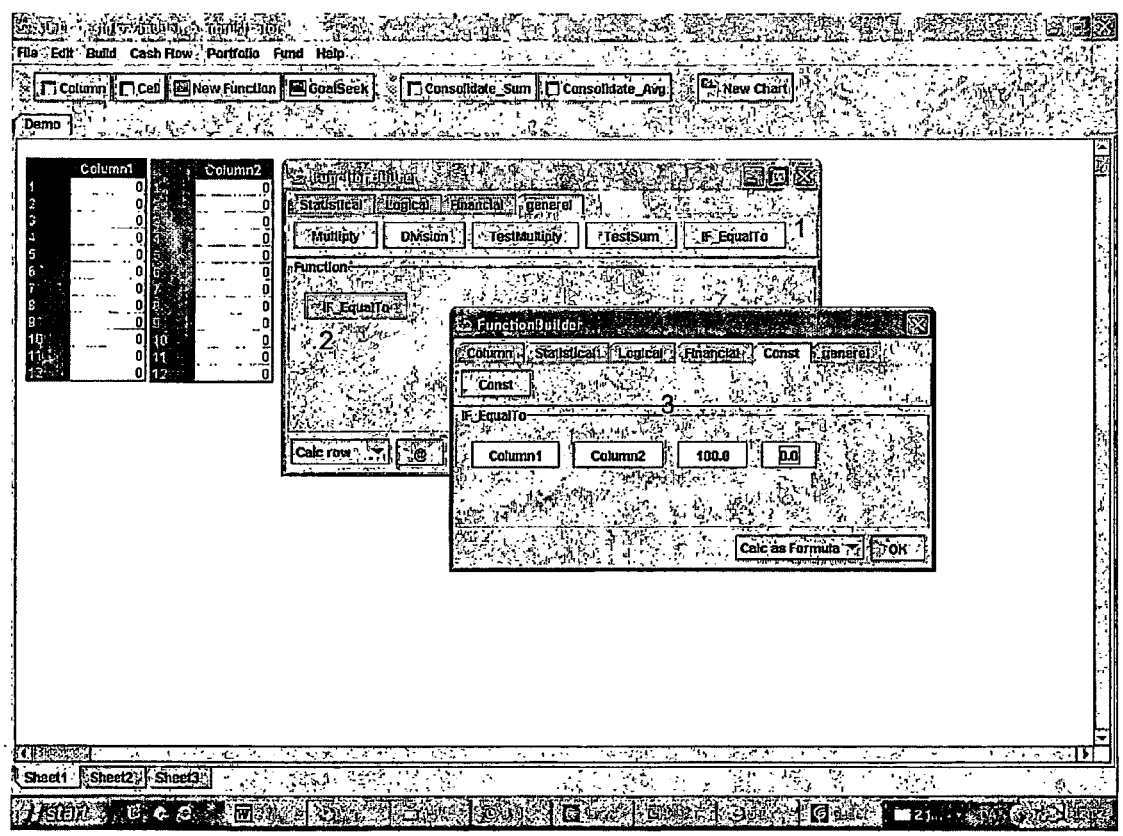
FIG. 35 shows the function builder displaying a retrieved function.

In the illustrated embodiment of the present invention, a user can store a user-defined formula in a library. The user may associate a formula with a cell panel by clicking a button, FIG. 30, button 5. By clicking button 6 in FIG. 30, the same formula could be stored in a library to be used later in the same spreadsheet library or in other spreadsheet models. To be able to identify the new "built-in" formula, the user will be asked to give it a name, cf. FIG. 34, window 2 (e.g. IF_EqualTo). The formula will then appear in the Formula Builder as a user defined built-in formula, cf. FIG. 35, window 1. The formula can be dropped into the work area of the Formula Builder, cf. FIG. 35, window 2, and software building blocks can be embedded, cf. FIG. 35, window 3. In FIG. 35, the formula takes four embedded building blocks equivalent to the four software data building blocks in FIG. 30.

Figure 36:
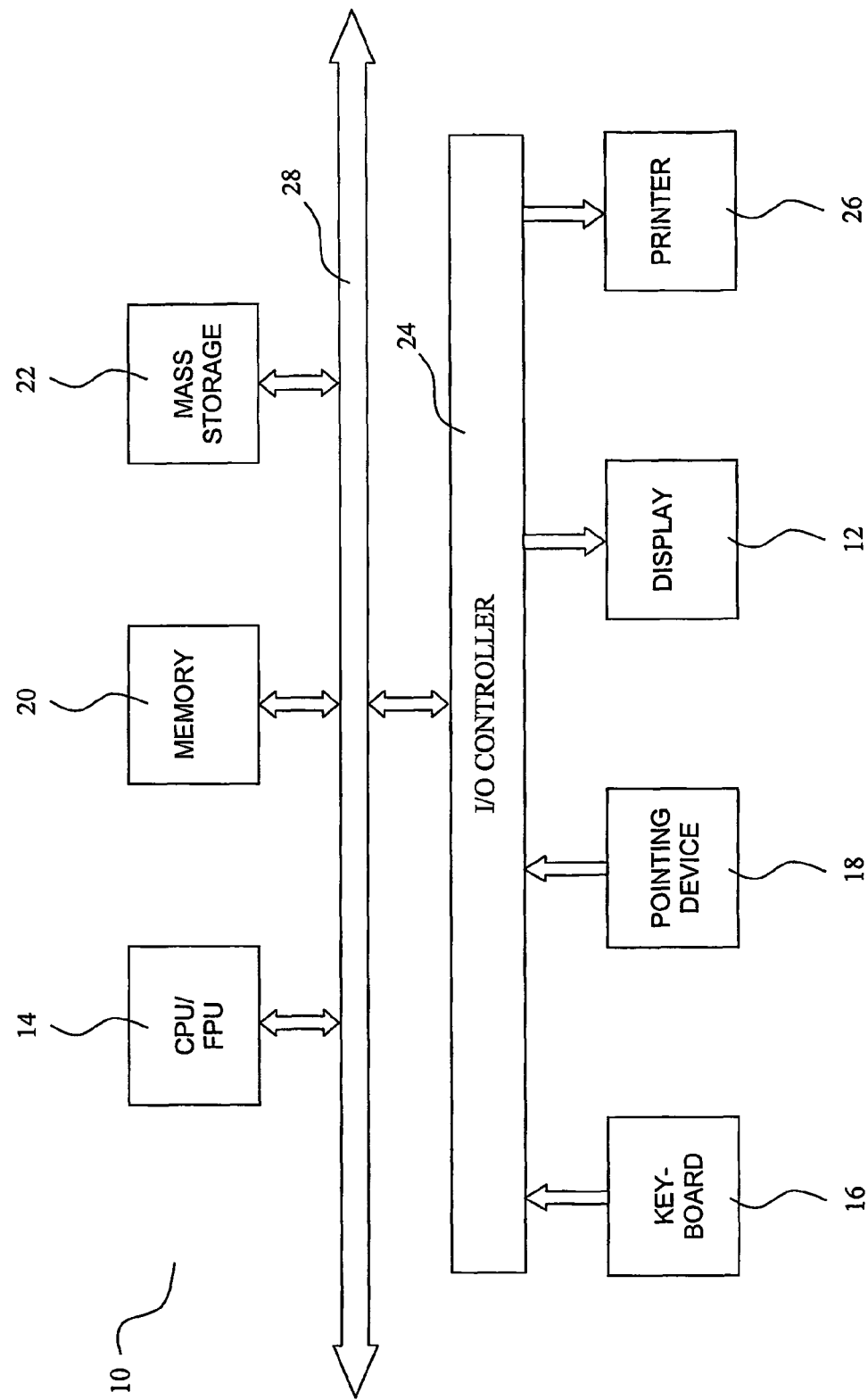
FIG. 36 is a blocked schematic of an embodiment of the present invention.
Figure 37:
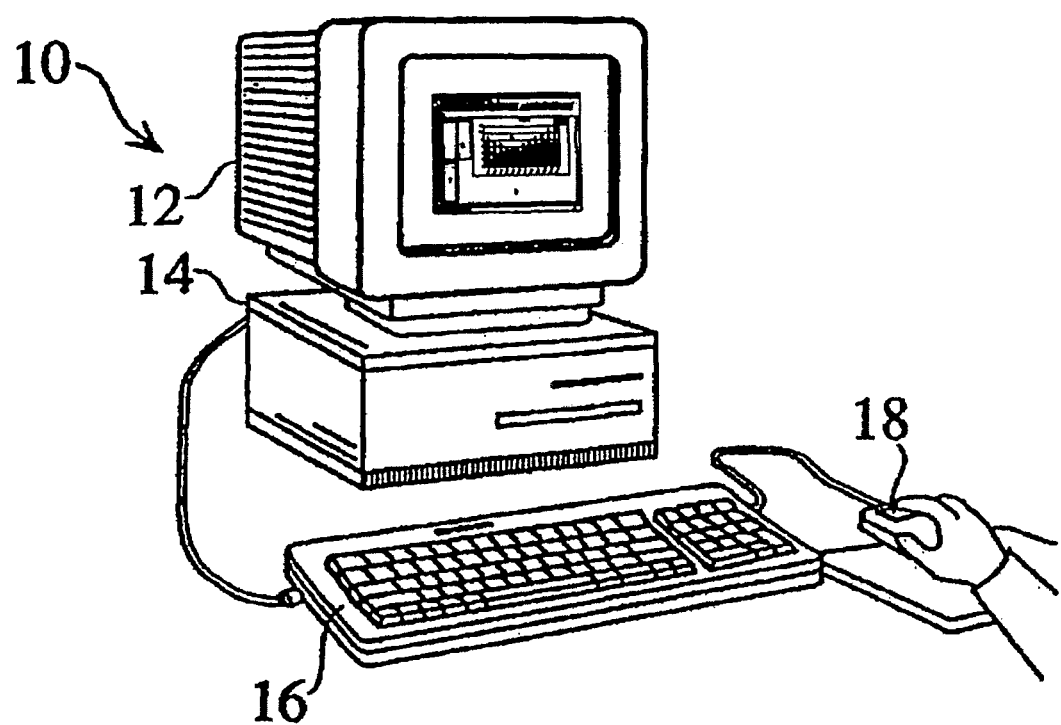
FIG. 37 is a perspective view of the electronic mathematical model builder embodiment of FIG. 36.

FIG. 36 is a blocked schematic of the embodiment shown in FIG. 37. The illustrated electronic mathematical model builder 10 according to the present invention, includes a central processing unit (CPU) 14 with a math coprocessor or floating-point processing unit (FPU), a main memory 20, an input/output controller 24, a keyboard 16, a pointing device 18, e.g., mouse, track ball, pen device, or the like, a display device 12, and a mass storage 22 (e.g., hard disk). Additional input/output devices, such as a printing device 26, may be included in the system 10 as desired. As illustrated, the various components of the system 10 communicate through a system bus 28 or similar architecture.

A computer software system is provided for directing the operation of the computer system 10. The software system is stored in system memory 20 and on disk memory 22, includes a kernel or operating system and an interface. One or more application programs may be "loaded" (i.e., transferred from storage 22 into memory 20) for execution by the system 10. The system 10 receives user commands and data through the user interface, i.e. the keyboard 16 and the pointing device 18; these inputs may then be acted upon by the system 10 in accordance with instructions from operating system module and/or the application module. The interface, which may support a character-based and/or preferably a graphical user interface (GUI), also serves to display results, whereupon the user may supply additional inputs or terminate the session.

FIG. 36 is a perspective view of an electronic mathematical model builder 10 according to the present invention. The illustrated embodiment 10 includes a personal computer with a processor 14, a memory 20, an internal hard disc for mass storage 22, a CD-ROM drive, an audio capability, a display 12, a keyboard 16, and a pointing device, such as a track ball or a mouse 18. In FIG. 36, the image of FIG. 4 is shown on the display screen. The display 12 may have a touch sensitive display screen. It will be appreciated by those skilled in the art that the actual hardware implementation of the system is a matter of design choice. Thus, the model builder may be distributed across a network connected to a server, e.g. it may be provided by an on-line service for example via the Internet. For example, the computer 10 may be a portable computer that can be connected to the Internet via a mobile phone or via a wireless network, e.g. a hot spot, or the user may be connected to the Internet via a broadband connection, e.g. utilising the user's TV.

FIGS. 38-43 illustrate another embodiment of the function builder of the present invention.

Figure 38:
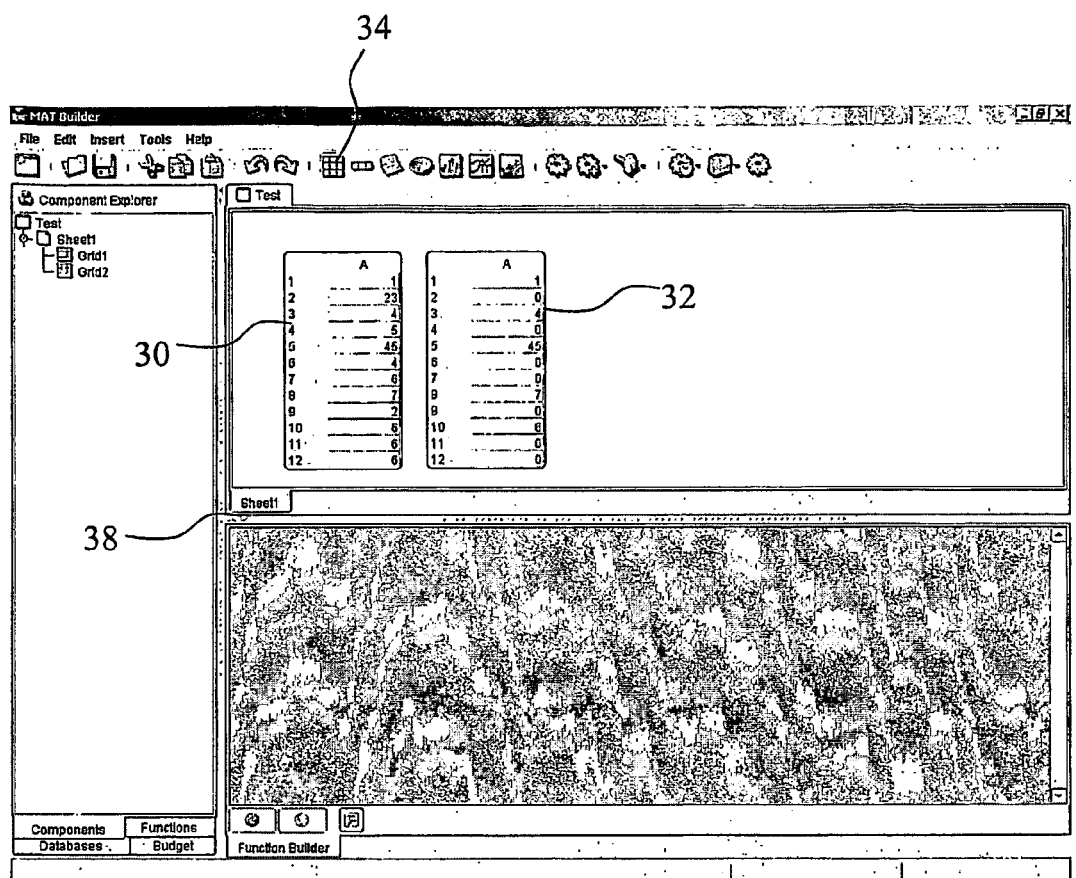
FIGS. 38-43 illustrate the process of creating a function according to another embodiment of the mathematical model builder of the present invention.
Figure 39:
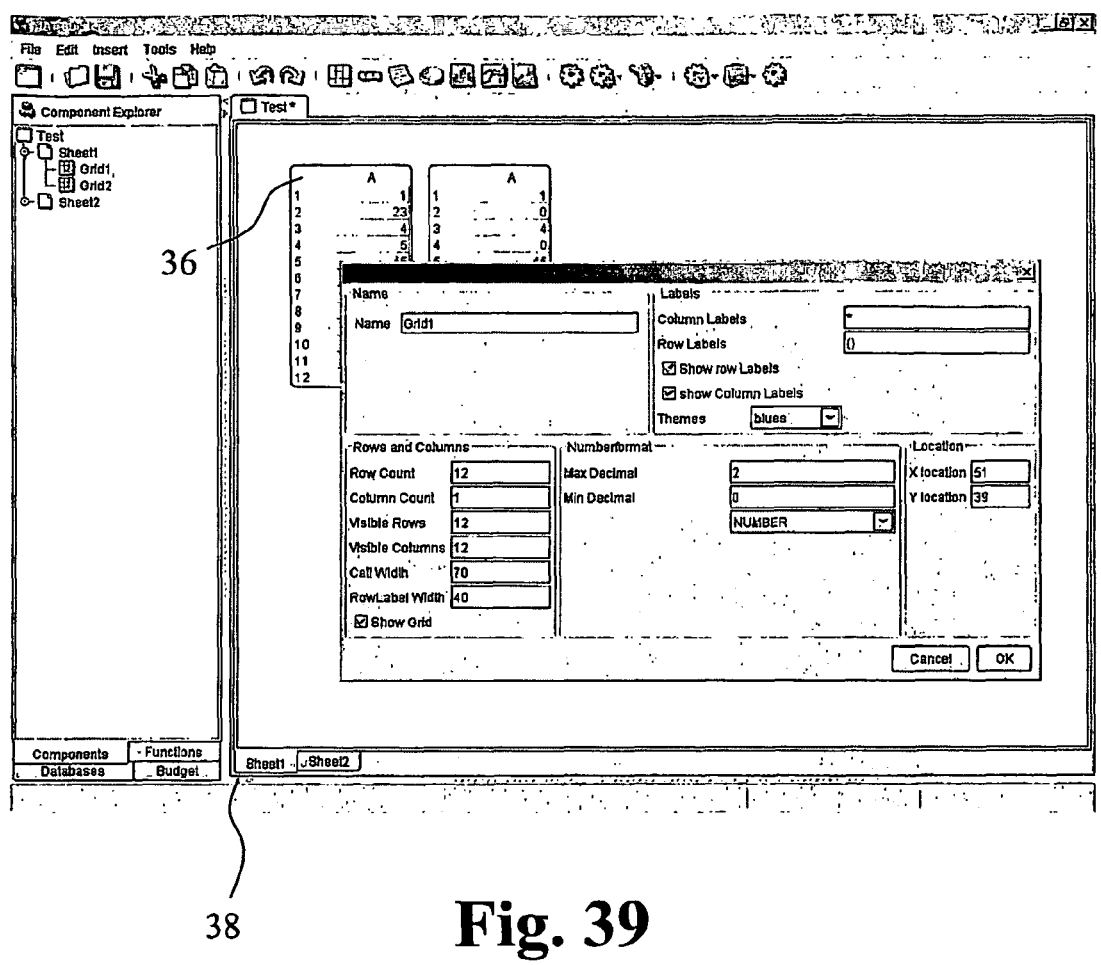
Figure 40:
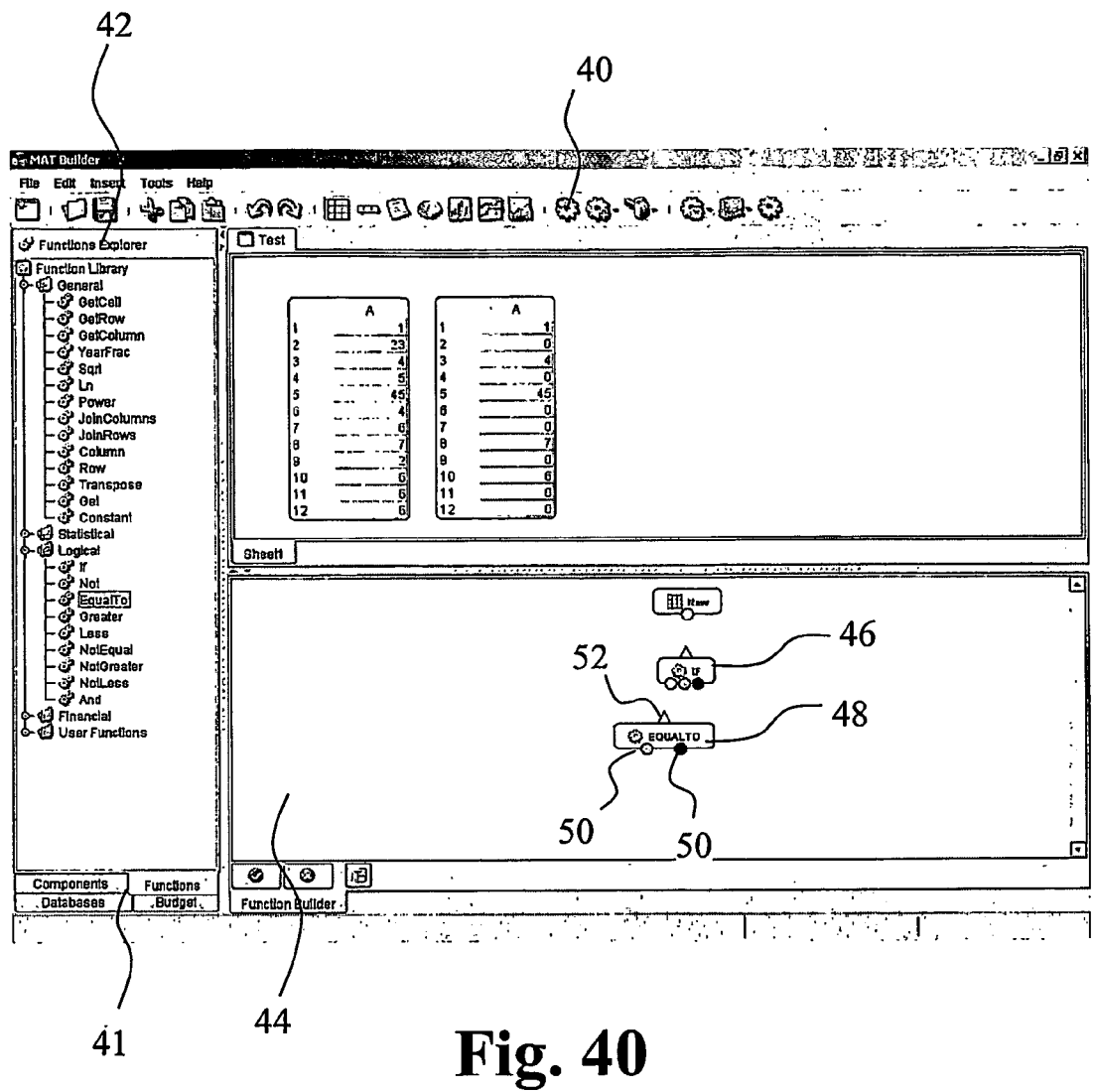

In FIG. 38 two data panels, Grid1 30, and Grid2 32, are created by dragging and dropping from the grid button 34. The properties of a panel may be changed or adjusted by double-clicking at the upper left corner 36 of the panel as illustrated in FIG. 39.

The illustrated embodiment of the present invention provides a tool for constructing functions or formulas in the electronic mathematical model builder. The function builder may be displayed or minimized as illustrated in FIGS. 38 and 39 respectively by clicking the buttons 38. Clicking the new function button 40 in FIG. 40 in the tools palette 43 of the model builder creates a new function.

In this embodiment the model builder comprises a tabbed pane 41 with a number of tabs to organise the different types of elements, e.g. components, functions, databases, budget, in the model builder. The tabbed pane comprises a function explorer 42. The different types of built-in functions (e.g. general, statistical, logical and financial) and user-defined functions are arranged as components in a tree structure. The function component in the function explorer can be added to a function in the function builder 44 by drag and drop techniques as illustrated by the two graphical symbols for the logical functions IF 46 and EQUALTO 48 in FIG. 40.

The graphical symbols in the function builder correspond to function components, and have one or more input 50 and/or output 52 ports depending on the nature of the component.

The function components of a function may be panels with data, e.g. input from a keyboard, database, etc., constants or any mathematical function, such as a user defined function or any conventional mathematical function.

Figure 41:
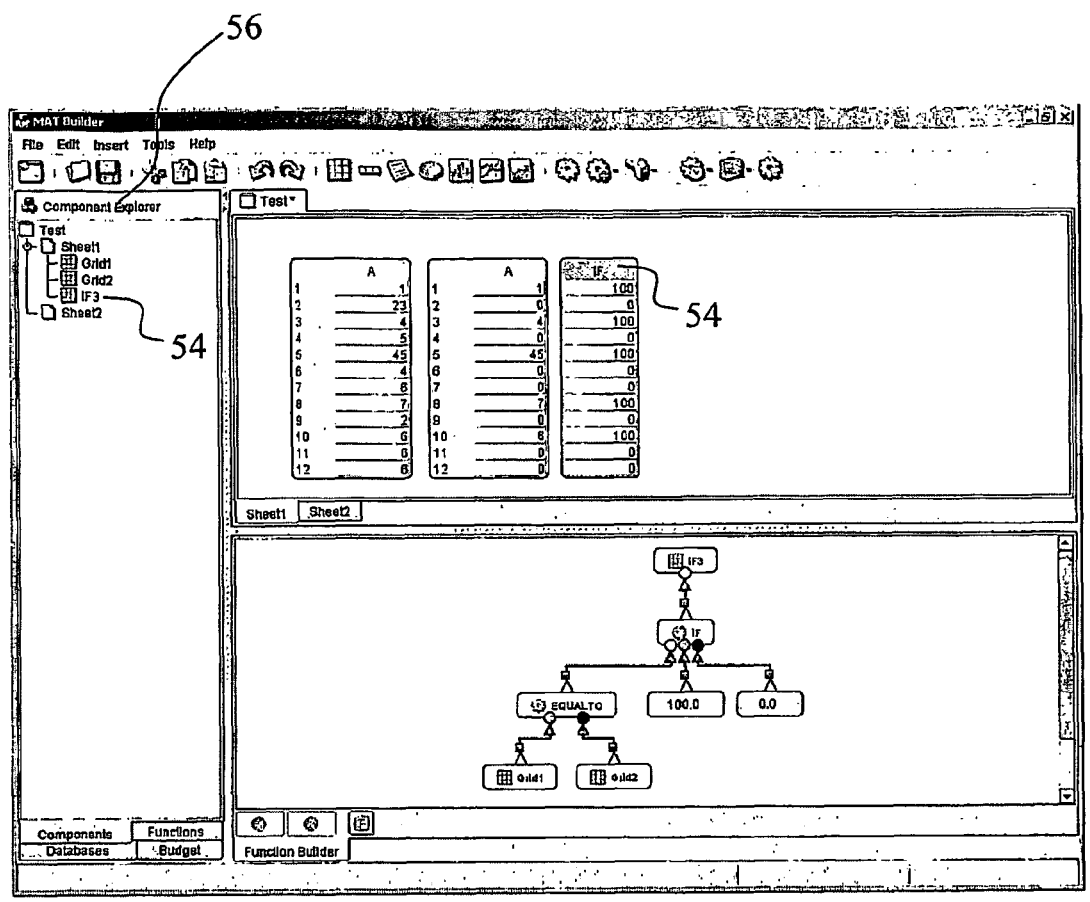
Figure 43:
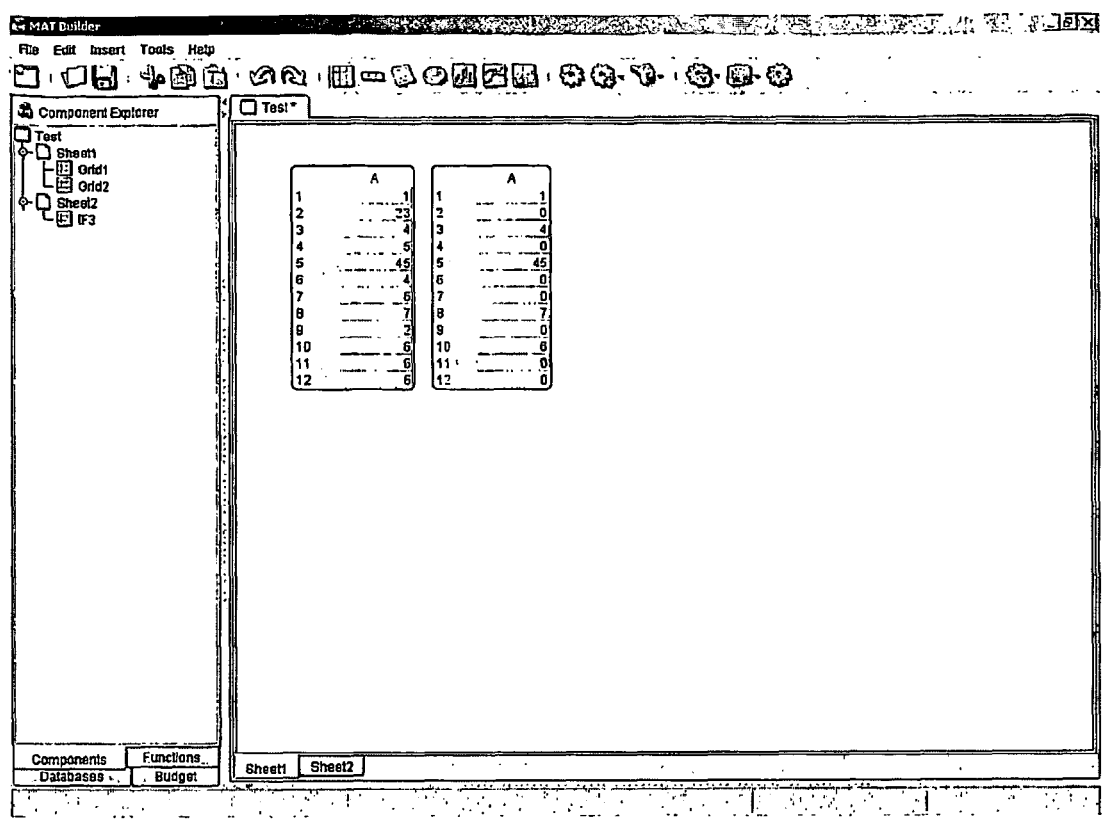

The FIGS. 41 and 43 illustrate individual and independent positioning of a panel in the display of the model. In FIG. 41 the panel IF3 54 is positioned on sheet 1, while the panel IF3 54 is moved to sheet 2 in the display in FIG. 43. Each panel of the model is thus easily moved between different sheets in the display of the model without the positioning of a panel affecting the functions in the model. The Component Explorer 56 in the tabbed pane 41 provides a comprehensive view of the components of the model.

Figure 42:
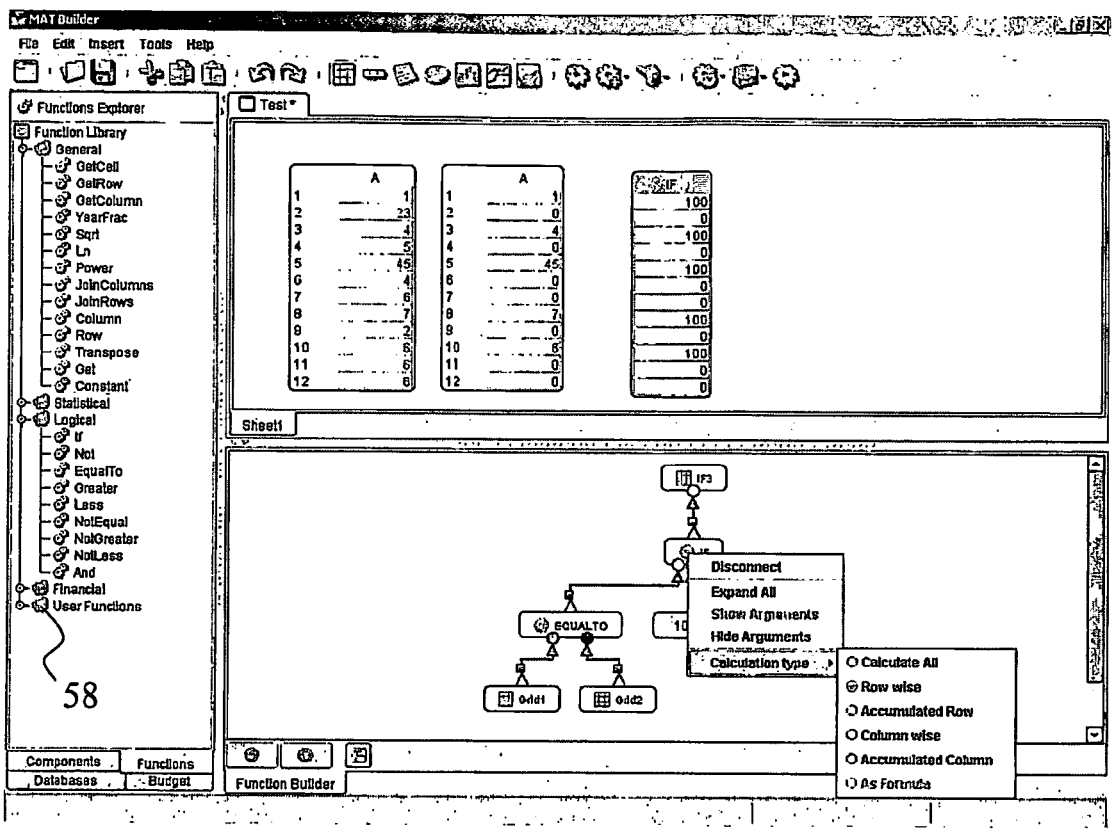

The user may store the formula in a library of user-defined formulas cf. 58 in FIG. 42 in a similar way as described in connection with FIGS. 30 and 34.

The invention claimed is:

1. An electronic mathematical model builder comprising:
a memory for storage of data,
a processor for defining panels of cells stored in the memory, for entering data into the cells and for processing data stored in the cells,
a user interface component with a display for displaying panels of cells in a work area and for specifying input data to be entered into the cells of at least one input panel, and
a function builder component configured for establishing a function comprising mathematical relations between the at least one input panel and an output panel with a plurality of cells, the established function being stored independently from the plurality of cells and not inherently connected with the plurality of cells via a special token used to invoke the established function, the function builder comprising fields for user specification of a desired function by mathematical operators, and input variables of the function,
wherein the processor determines respective output function values for the input data of the at least one input panel according to the established function, the established function being separate from the output function values.

2. A model builder according to claim 1, wherein the function builder component comprises components for selection by the user for specification of the function.

3. A model builder according to claim 2, wherein at least one component is a function component selected from the group consisting of mathematical operators, mathematical functions, logical and Boolean functions, financial functions, string functions, and data base functions.

4. A model builder according to claim 1, wherein a function component is a Java class that encapsulates the calculation of a specific function, and the data that is input for the function.

5. A model builder according to claim 2 wherein at least one component is a data component including data of a panel of cells.

6. A model builder according to claim 5, wherein the data component is a Java class that holds an object reference to a specific data source.

7. A model builder according to claim 6, wherein a data source is selected from a panel of cells and an external database.

8. A model builder according claim 1, further comprising data components including data from an external data source.

9. A model builder according to claim 1, wherein the function builder component comprises graphical symbols relating to respective components for selection by the user to be incorporated into the desired function.

10. A model builder according to claim 9, wherein the graphical symbols relating to respective components are organized under various tabs according to their type.

11. A model builder according to claim 9, wherein the graphical symbols relating to respective components are organized in a graphical, hierarchical diagram according to their type.

12. A model builder according to claim 9, wherein components are selected by dragging and dropping the corresponding graphical symbols into the function field of the function builder component.

13. A model builder according to claim 1, wherein the function builder component comprises tools for specification of calculation type.

14. A model builder according to claim 13, wherein the calculation type is selected from by row, by column, all cells in a panel, selected cells in a panel, accumulated, and non-accumulated.

15. A model builder according to claim 1, wherein the user interface comprises means for naming functions built with the function builder component.

16. A model builder according to claim 15, further comprising means for storage and retrieval of functions in the memory.

17. A model builder according to claim 1, further comprising means for storing a selected part of the model in the memory.

18. A model builder according to claim 1, wherein a first function may be an input variable to a second function.

19. A model builder according to claim 1, wherein the function builder component further comprises tools for user definition of a mathematical operator.

20. A model builder according to claim 1, further including tools for saving a model document as a standalone Java .jar file.

21. A model builder according to claim 1, further including tools for saving a model document as a standalone application.

22. A model builder according to claim 21, wherein the standalone application is selected from a Java Applet, a server-side application, and an .exe-file.

23. A model builder according to claim 1, further including tools for documenting the structure of a specific model document.

24. A model builder according to claim 1, wherein the function builder component is further adapted for automatic generation of an output panel comprising a plurality of cells for containing values of the function.

25. A model builder according to claim 1, further including tools for saving a model document including data.

26. A model builder according to claim 1, further including tools for saving a model document without data.

27. A model builder according to claim 1, wherein the function builder component creates the output panel of cells to hold the output function values.

28. A method for building a mathematical model comprising:
- defining, by a processor having a memory coupled thereto, panels of cells stored in the memory, for entering data into the cells and for processing data stored in the cells;
- displaying in a user interface component panels of cells in a work area and specifying input data to be entered into the cells of at least one input panel; and
- establishing with a function builder component a function comprising mathematical relations between the at least one input panel and an output panel with a plurality of cells, the established function being stored independently from the plurality of cells and not inherently connected with the plurality of cells via a special token used to invoke the established function, the function builder component comprising fields for user specification of a desired function by mathematical operators, and input variables of the function,
- wherein the processor determines respective output function values for the input data of the at least one input panel according to the established function, the established function being separate from the output function values.

29. A non-transitory computer readable medium including program code for building a mathematical model, the medium comprising:
- program code for defining, by a processor having a memory coupled thereto, panels of cells stored in the memory, for entering data into the cells and for processing data stored in the cells,
- program code for displaying in a user interface component panels of cells in a work area and specifying input data to be entered into at least one input panel, and
- program code for establishing with a function builder component a function comprising mathematical relations between the at least one input panel and an output panel with a plurality of cells, the established function being stored independently from the plurality of cells and not inherently connected with the plurality of cells via a special token used to invoke the established function, the function builder component comprising fields for user specification of a desired function by mathematical operators, and input variables of the function,
- wherein the function builder provides the input data of the at least one input panel to the function, the established function being separate from the output function values.

* * * * *